US012783355B2

(12) United States Patent
Akel et al.

(10) Patent No.: US 12,783,355 B2
(45) **Date of Patent: *Nov. 3, 2026**

(54) PARITY-BASED ERROR MANAGEMENT FOR A PROCESSING SYSTEM

(71) Applicant: Micron Technology, Inc., Boise, ID (US)

(72) Inventors: Ameen D. Akel, Rancho Cordova, CA (US); Helena Caminal, Ithaca, NY (US); Sean S. Eilert, Penryn, CA (US)

(73) Assignee: Micron Technology, Inc., Boise, ID (US)

( * ) Notice: Subject to any disclaimer, the term of this patent is extended or adjusted under 35 U.S.C. 154(b) by 51 days.

This patent is subject to a terminal disclaimer.

(21) Appl. No.: 18/821,203

(22) Filed: Aug. 30, 2024

(65) Prior Publication Data

US 2024/0419549 A1 Dec. 19, 2024

Related U.S. Application Data

(63) Continuation of application No. 17/652,231, filed on Feb. 23, 2022, now Pat. No. 12,105,589.

(51) Int. Cl.
*G06F 11/10* (2006.01)

(52) U.S. Cl.
CPC .................................. *G06F 11/108* (2013.01)

(58) Field of Classification Search
CPC ..................................................... G06F 11/108
See application file for complete search history.

(56) References Cited

U.S. PATENT DOCUMENTS

| | | | | |
|---|---|---|---|---|
| 4,965,717 | A | 10/1990 | Cutts et al. | |
| 4,982,379 | A | 1/1991 | Miyata | |
| 7,948,496 | B2 | 5/2011 | Hansen et al. | |
| 9,734,190 | B1 | 8/2017 | Holenstein et al. | |
| 9,760,598 | B1 | 9/2017 | Holenstein et al. | |
| 10,078,565 | B1 * | 9/2018 | Petersson .............. | G06F 11/181 |
| 2005/0125638 | A1 | 6/2005 | Ford et al. | |
| 2005/0125641 | A1 | 6/2005 | Ford et al. | |

(Continued)

FOREIGN PATENT DOCUMENTS

| | | | |
|---|---|---|---|
| GB | 2411974 | A | 9/2005 |
| WO | 2013/181803 | A1 | 12/2013 |

OTHER PUBLICATIONS

Wikipedia Article, "Function (computer programming)", published Dec. 30, 2021, retrieved from https://en.wikipedia.org/w/index.php?title=Function_(computer_programming)&oldid=1062701489 on Nov. 21, 2023, pp. 1-16 (Year: 2021).*

(Continued)

*Primary Examiner* — Ashish Thomas
*Assistant Examiner* — Indranil Chowdhury
(74) *Attorney, Agent, or Firm* — Holland & Hart LLP

(57) ABSTRACT

Methods, systems, and devices for parity-based error management are described. A processing system that performs a computational operation on a set of operands may perform a computational operation, (e.g., the same computational operation) on parity bits for the operands. The processing system may then use the parity bits that result from the computational operation on the parity bits to detect, and discretionarily correct, one or more errors in the output that results from the computational operation on the operands.

19 Claims, 12 Drawing Sheets

(56) References Cited

U.S. PATENT DOCUMENTS

| | | | | |
|---|---|---|---|---|
| 2006/0195766 | A1 | 8/2006 | Shibata | |
| 2013/0024721 | A1 | 1/2013 | Kabulepa et al. | |
| 2013/0246878 | A1 | 9/2013 | Pancholi et al. | |
| 2015/0280748 | A1 | 10/2015 | Gendler et al. | |
| 2017/0070242 | A1 | 3/2017 | Gendler et al. | |
| 2017/0185414 | A1 | 6/2017 | Jin et al. | |
| 2018/0232477 | A1 | 8/2018 | Mazzawi et al. | |
| 2018/0239665 | A1 | 8/2018 | Hutton et al. | |
| 2019/0295633 | A1 | 9/2019 | Giterman et al. | |
| 2020/0169269 | A1 | 5/2020 | Kwak | |
| 2020/0210276 | A1 | 7/2020 | Sullivan et al. | |
| 2021/0081276 | A1 | 3/2021 | Suzuki et al. | |
| 2021/0167798 | A1 | 6/2021 | Kwak | |
| 2021/0173743 | A1 | 6/2021 | Xie et al. | |
| 2022/0197653 | A1 | 6/2022 | Ould-Ahmed-Vall | |
| 2022/0247428 | A1 | 8/2022 | Kwak | |
| 2022/0269558 | A1 | 8/2022 | Sullivan et al. | |
| 2022/0269560 | A1 | 8/2022 | Chung et al. | |
| 2023/0065783 | A1 | 3/2023 | Eilert et al. | |
| 2023/0069790 | A1 | 3/2023 | Eilert et al. | |
| 2023/0208444 | A1 | 6/2023 | Akel et al. | |
| 2023/0214148 | A1 | 7/2023 | Eilert et al. | |
| 2023/0244532 | A1 | 8/2023 | Hillel et al. | |
| 2023/0350746 | A1 | 11/2023 | Huang et al. | |
| 2026/0064308 | A1* | 3/2026 | Sforzin | G06F 3/0655 |
| 2026/0072790 | A1* | 3/2026 | Lee | G06F 11/108 |

OTHER PUBLICATIONS

A E. Slade and H. O. McMahon, "A cryotron catalog memory system," in Eastern Joint Computer Conference: New Developments in Computers, 1957.

A Morad, L. Yavits, S. Kvatinsky, and R. Ginosar, "Resistive GP-SIMD processing-in-memory," ACM Trans. Archil. Code Optim., 2016.

C C. Foster, Content Addressable Parallel Processors. John Wiley & Sons, Inc., 1976 (233 pages).

G E. Sayre, "Slaran: An associative approach to multiprocessor architecture," in Computer Architecture.Springer Berlin Heidelberg, 1976.

Helena Caminal, Kailin Yang, Srivatsa Srinivasa, Akshay Ramanathan, Khalid Al-Hawaj, Tianshu, Wu, Vijay Narayanan, Christopher Batten, Jos e Mart nez, \CAPE: A Content-Addressable Processing Engine, The 27th IEEE ntemational Symposium on High-Performance Computer Architecture (HPCA-27), Feb. 2021, Seoul, South Kore.

K. Pagiamtzis and A. Sheikholeslami, "Content-addressable memory (CAM) circuits and architectures: a tutorial and survey," IEEE Journal of Solid-Slate Circuits, 2006.

L Yavits, A. Morad, and R. Ginosar, "Computer architecture with associative processor replacing last-level cache and simd accelerator," IEEE Transactions on Computers, 2015.

S. Jeloka, N. B. Akesh, D. Sylvester, and D. Blaauw, "A 28 nm configurable memory (TCAM/BCAM/SRAM) using push-rule 61bit cell enabling logic-in-memory," IEEE Journal of Solid-Slate Circuits, 2016.

Y Zha and J_ Li, "Hyper-AP: Enhancing associative processing through a full-stack optimization," in 2020 ACM/IEEE 47th Annual International Symposium on Computer Architecture, 2020.

* cited by examiner vA: 0 0 0 1
vB: 1 0 0 1
Bit position $i$: 3 2 1 0

| $c_i$ | $vA_i$ | $vB_i$ | $c_{i+1}$ | $vD_i$ |
|---|---|---|---|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

Truth Table 205 vD: 1 0 1 0
Bit position $i$: 3 2 1 0

200

PARITY-BASED ERROR MANAGEMENT FOR A PROCESSING SYSTEM

CROSS REFERENCE

The present application for patent is a continuation of U.S. patent application Ser. No. 17/652,231 by Akel et al., entitled "PARITY-BASED ERROR MANAGEMENT FOR A PROCESSING SYSTEM," filed Feb. 23, 2022, assigned to the assignee hereof, and is expressly incorporated by reference in its entirety herein.

FIELD OF TECHNOLOGY

The following relates to one or more systems for memory, including parity-based error management.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

In some systems, a host device may offload various processing tasks to an electronic device, such as an accelerator. For example, a host device may offload computations, such as vector computations or scalar computations, to the electronic device, which may use compute engines and processing techniques to perform the computations. Such offloading of computations may involve communication of operands or operand information from the host device to the electronic device, and in turn communication of results from the electronic device to the host device. Thus, the bandwidth of the electronic device may be constrained by the communication interface between the electronic device and the host device, as well as the characteristics (e.g., size, serial processing) related to the compute engines. According to the techniques described herein, a host device may increase processing bandwidth by offloading processing tasks to an associative processor memory (APM) system that uses, among other aspects, in-memory associative processing to perform vector computations.

But like other types of systems, the APM system may be susceptible to errors in some circumstances. For example, the APM system may experience storage errors (e.g., errors that occur while data is stored in memory) or sense errors (e.g., errors that occur during sensing of data that is stored in memory) that negatively impact performance. For instance, if a computation is performed across multiple memory planes, one or more of the memory planes may output a result with an error. According to the techniques described herein, an APM system that performs a computation on a set of operands may perform the same computation on parity bits for the operands, a process referred to herein as "carrying through" the parity bits. The parity bits that result from carrying through the parity bits may help the APM system detect, and discretionarily correct, one or more errors in the output that results from the computational operation on the operands. Parity bits may also be referred to as error detection bits, error correction bits, or other suitable terminology.

Features of the disclosure are initially described in the context of systems and vector computation as described with reference to FIGS. 1 and 2. Features of the disclosure are described in the context of planes and a process flow as described with reference to FIGS. 3-6. Features of the disclosure are described in the context of a processing system and an APM system as described with reference to FIGS. 7 and 8. These and other features of the disclosure are further illustrated by and described with reference to an apparatus diagram and flowcharts that relate to parity-based error management as described with reference to FIGS. 9-12.

Figure 1:
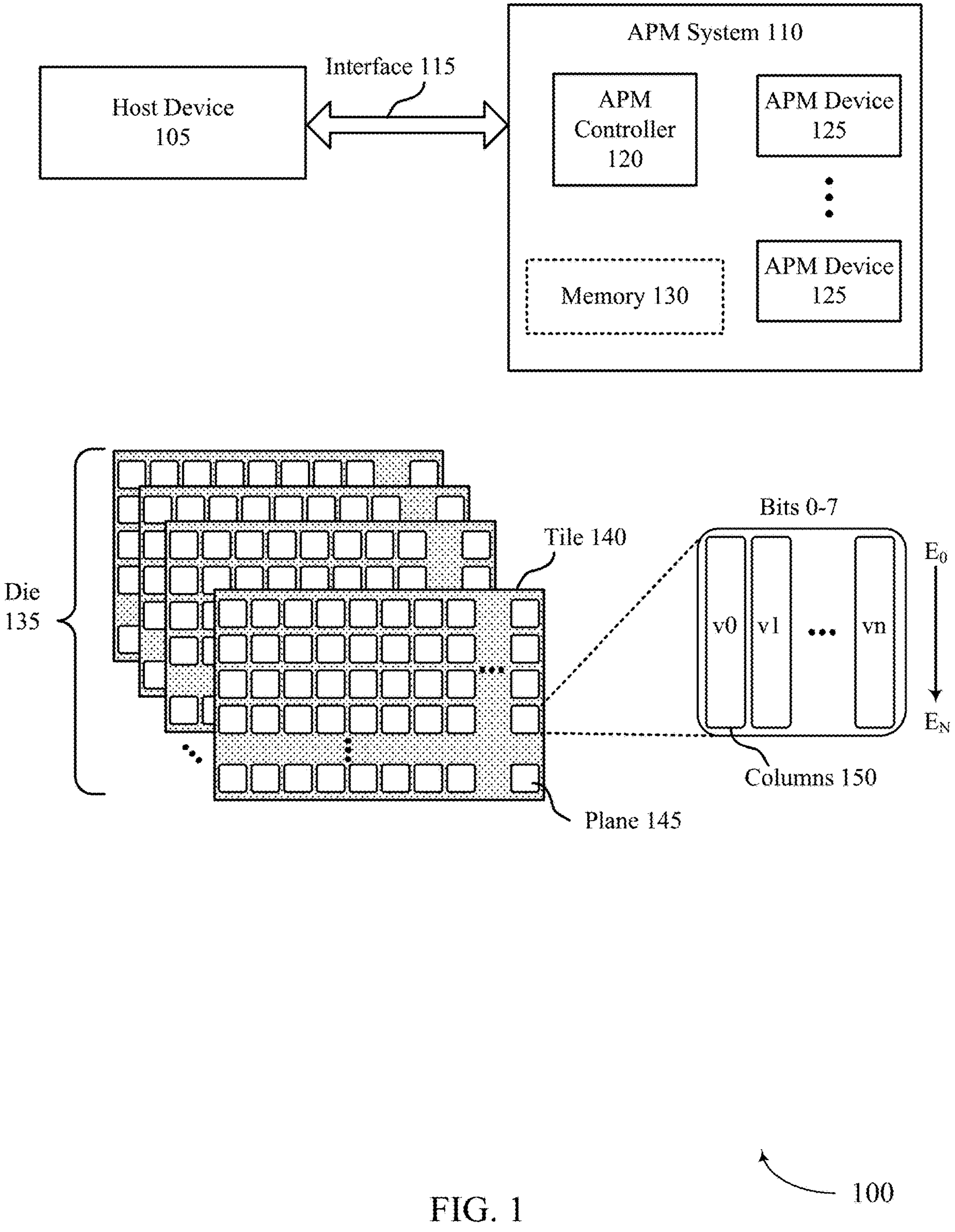
FIG. 1 illustrates an example of a system that supports parity-based error management in accordance with examples as disclosed herein.

FIG. 1 illustrates an example of a system 100 that supports parity-based error management in accordance with examples as disclosed herein. The system 100 may include a host device 105 and an associative processing memory (APM) system 110. The host device 105 may interact with (e.g., communicate with, control) the APM system 110 as well as other components of the device that includes the APM system 110. In some examples, the host device 105 and the APM system 110 may interact over the interface 115, which may be an example of a Compute Express Link (CXL) interface or other type of interface.

In some examples, the system 100 may be included in, or coupled with, a computing device, an electronic device, a mobile computing device, or a wireless device. The device may be a portable electronic device. For example, the device may be a computer, a laptop computer, a tablet computer, a smartphone, a cellular phone, a wearable device, an internet-connected device, or the like. The host device 105 may be or include a system-on-a chip (SoC), a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host, a host system, or other suitable terminology.

The APM system 110 may operate as an accelerator (e.g., a high-speed processor) for the host device 105 so that the host device 105 can offload various processing tasks to the APM system 110, which may be configured to execute the processing tasks faster than the host device 105. For example, the host device 105 may send a program (e.g., a set of instructions, such as Reduced Instruction Set V (RISC-V) vector instructions) to the APM system 110 for execution by the APM system 110. As part of the program, or as directed by the program, the APM system 110 may perform various computational operations on vectors (e.g., the APM system 110 may perform vector computing). A computational operation may refer to a logic operation, an arithmetic operation, or other types of operations that involve the manipulation of vectors. A vector may include one or more elements, which may also be referred to as vector elements, each having a respective quantity of bits. The length or size of a vector may refer to the quantity of elements in the vector and the length or size of an element may refer to the quantity of bits in the element.

The APM controller 120 may be configured to interface with the host device 105 on behalf of the APM devices 125. Upon receipt of a program from the host device 105, the APM controller 120 may parse the program and direct or otherwise prompt the APM devices 125 to perform various computational operations associated with or indicated by the program. In some examples, the APM controller 120 may retrieve (e.g., from the memory 130) the vectors for the computational operations and may communicate the vectors to the APM devices 125 for associative processing. In some examples, the APM controller 120 may indicate the vectors for the computational operations to the APM devices 125 so that the APM devices 125 can retrieve the vectors from the memory 130. In some examples, the host device 105 may provide the vectors to the APM system 110. So, the memory 130 may be configured to store vectors that are accessible by the APM controller 120, the APM device 125, the host device 105, or a combination thereof.

The vectors for computational operations at the APM devices 125 may be indicated by (or accompanied by) the program received from the host device 105 or by other control signaling (e.g., other separate control signaling) associated with the program. For example, a program that indicates a computational operation for a pair of vectors may include one or more addresses (or one or more pointers to one or more addresses) of the memory 130 where the vectors are stored. Although shown included in the APM system 110, the memory 130 may be external to, but nonetheless coupled with, the APM system 110. Although shown as a single component, the functionality of memory 130 may be provided by multiple memories 130.

The APM devices 125 may include memory cells, such as content-addressable memory cells (CAMs) that are configured to store vectors (e.g., vector operands, vector results) associated with computational operations. An operand may refer to a quantity on which a computational operation is performed. A vector operand may be a vector that is an operand for a computational operation (e.g., a vector operand may be a vector upon which the computation operation is executed). A vector result may be a vector that results from a vector computation.

The APM system 110 may be configured to store information, such as truth tables, for various computational operations, where information (e.g., a truth table) for a given computational operation may indicate results of the computational operation for various combinations of logic values. For example, the APM system 110 may store information (e.g., one or more truth tables) for logic operations (e.g., AND operations, OR operations, XOR operations, NOT operations, NAND operations, NOR operations, XNOR operations) as well as arithmetic operations (e.g., addition operations, subtraction operations), among other types of operations. Memory cells that store information (e.g., one or more truth tables) for a computational operation may store the various combinations of logic values for the operands of the computational operation as well as the corresponding results and carry bits, if applicable, for each combination of logic values. The APM system 110 may store truth tables for associative processing in one or more memories (e.g., in one or more on-die mask ROM(s)) which may be coupled with or included in the APM system 110. For example, the truth tables may be stored in the memory 130, in local memories of the APM devices 125, or both. In either example, an APM device 125 may cache common instructions on-device (e.g., instead of fetching them or receiving them).

At least some APM devices 125, if not each APM device 125, may use associative processing to perform computational operations on the vectors stored in that APM device 125. Unlike serial processing (where vectors are moved back and forth between a processor and a memory), associative processing may involve searching and writing vectors in-memory (also referred to as "in-situ"), which may allow for parallelism that increases processing bandwidth. Performance of computational operations in-situ may also allow the system 100 to, among other advantages, avoid the bottleneck at the interface between the host device 105 and the APM system 110, which may reduce latency and power consumption compared to other processing techniques, such as serial processing. Associative processing may also be referred to as associative computing or other suitable terminology.

In some examples, an APM device 125 that uses associative processing to perform a computational operation may leverage information, such as a truth table, to execute the computational operation in a bit-wise manner using, for example, a "search and write" technique. For example, if the APM device 125 includes CAM cells that store vector operands for a computational operation, the APM device 125 may search the CAM cells for bits of the vector operands that match an entry of the truth table corresponding to that computational operation, determine the result of the computational operational for the bits based on the matching entry of the truth table, and write the result back in the content-addressable memory. The APM device 125 may then proceed to the next significant bits for the vectors and use associative processing to perform the computational operation on those bits. In some examples, the computational operation for bits may involve an arithmetic output bit (e.g., a carry bit, a borrow bit) bit that was determined as part of the computational operation on less significant bits.

Each APM device 125 may include one or more dies 135, which may also be referred to as memory dies, semiconductor dies, or other suitable terminology. A die 135 may include multiple tiles 140, which in turn may each include multiple planes 145. In some examples, the tiles 140 may be configured such that a single plane 145 per tile is operable or activatable at a time (e.g., one plane per tile may perform associative computing at a time). However, any quantity of tiles 140 may be active at a time (e.g., any quantity of tiles may be performing associative computing at a time). Thus, the tiles 140 may be operated in parallel, which may increase the quantity of computational operations that can be performed during a time interval, which in turn may increase the bandwidth of an APM device 125 relative to other different techniques. Use of multiple APM devices 125, as opposed to a single APM device 125, may further increase the bandwidth of the APM system 110 relative to other systems. Each APM device 125 may include a local controller or logic that controls the operations of that APM device 125.

Each plane 145 may include a memory array that includes memory cells, such as CAM cells. The memory cells in a memory array may be arranged in columns and rows and may be non-volatile memory cells or volatile memory cells. A memory array that includes CAM cells may be configured to search the CAM cells by content as opposed to by address. For example, a memory array that includes CAM cells storing vectors for a computational operation may compare the logic values of the operand bits of the vectors with entries from a truth table associated with the computational operation to determine which results correspond to those logic values.

As noted, an APM device 125 may be configured to store vectors associated with computational operations in the memory cells of that APM device 125. To aid in associative processing, the vectors may be stored in a columnar manner across multiple planes. For example, given a vector v0 that has multiple n-bit (e.g., n=32) elements (denoted $E_0$ through $E_N$), an APM device 125 may divide each element into sets of contiguous bits (e.g., four sets of eight contiguous bits). The APM device 125 may store the first set of contiguous bits (e.g., the least significant set of contiguous bits) for each element of vector v0 in a first plane 145, where each row of the plane 145 stores the first set of contiguous bits for a respective element of the vector v0. Thus, in some examples, the columns 150 may store the first eight bits of each element of the vector v0 (e.g., the columns 150 may span eight columns). In a similar manner, the APM device 125 may store the next significant set of contiguous bits from each element of the vector v0 in a second plane 145. And so on and so forth for the remaining sets of contiguous bits for the vector v0. Thus, the vector v0 may be stored in a columnar manner across multiple planes. The bits of other vectors v1 through vn may be stored in a similar columnar manner across the planes 145.

Spreading vectors across multiple planes using the columnar storage technique may allow an APM device 125 to store more vectors per plane 145 relative to other techniques, which in turn may allow the APM device 125 to operate on more combinations of vectors compared to the other techniques. For example, consider a plane that is 256 rows by 256 columns. Rather than storing eight vectors with 32-bit elements across a single plane, which may limit the APM device 125 to operating on those eight vectors (absent time-consuming vector movement), the APM device 125 may store 32 vectors with 32-bit elements across four planes, which allows the APM device 125 to operate on those 32 bit vectors (e.g., one plane at a time) without performing time-consuming vector movement.

In some examples, the APM devices 125 may store vectors according to a vector mapping scheme, which may be one of multiple vector mapping schemes supported by the APM devices 125. A vector mapping scheme may refer to a scheme for mapping (and writing) vectors to planes 145 of an APM device 125. For example, an APM device 125 may support a first vector mapping scheme, referred to as vector mapping scheme 1, and a second vector mapping scheme, referred to as vector mapping scheme 2. In vector mapping scheme 1, a vector may be spread across planes of the same tile 140. In vector mapping scheme 2, a vector may be spread across planes of different tiles 140. A vector mapping scheme may also be referred to as a storage scheme, a layout scheme, or other suitable terminology.

The APM system 110 may select between the vector mapping schemes before writing vectors to the APM devices 125 according the selected vector mapping scheme. For example, the APM system 110 may select the vector mapping scheme for a set of computational operations based on the sizes of the vectors associated with the set of computational operations, the types of the computations operations (e.g., arithmetic versus logic) in the set of computational operations, a quantity of the computational operations in the set, or a combination thereof, among other aspects. In some examples, the APM system 110 may select the vector mapping scheme in response to an indication of the vector mapping scheme provided by the host device 105. For example, the host device 105 may indicate the vector mapping scheme associated with a set of instructions for the set of computational operations. After vectors have been written to the APM devices 125 according to the selected vector mapping scheme, the APM devices 125 may use associative processing to perform computational operations on the vectors in accordance with the selected vector mapping scheme. Alternatively, a compiler or pre-processor may determine the vector mapping scheme.

The associative processing techniques described herein may be implemented by logic at the APM system 110, by logic at the APM devices 125, or by logic that is distributed between the APM system 110 and the APM devices 125. The logic may include one or more controllers, access circuitry, communication circuitry, or a combination thereof, among other components and circuits. The logic may be configured to perform aspects of the techniques described herein, cause components of the APM system 110 and/or the APM devices 125 to perform aspects of the techniques described herein, or both.

In some examples (e.g., if the vector element length is larger than the quantity of the columns 150), a vector may be distributed across multiple planes 145 of an APM device 125. In such an example, the APM device 125 may perform a computational operation (e.g., an arithmetic operation) on the vector on a plane-by-plane basis so that arithmetic output bits can be propagated through the planes. But performing a computational operation on a plane-by-plane basis may increase system latency. So, an APM device 125 may reduce system latency by using redundant planes (e.g., planes storing duplicated data representative of the same vector(s)) and performing the computational operation in parallel across the redundant planes based on different values for arithmetic output bits (e.g., carry bits, borrow bits).

In some examples, a pair (or more) of operand vectors may be distributed across multiple planes 145. In such an example, an APM device 125 that performs a computational operation on the operand vectors may detect any error(s) in the resulting vector for each plane by using one or more parity bits for each plane. For instance, the APM device 125 may carry through the one or more parity bits on a per-plane basis so that the resulting parity bit(s) for a plane indicate error information for the vector result for that plane.

Figure 2:
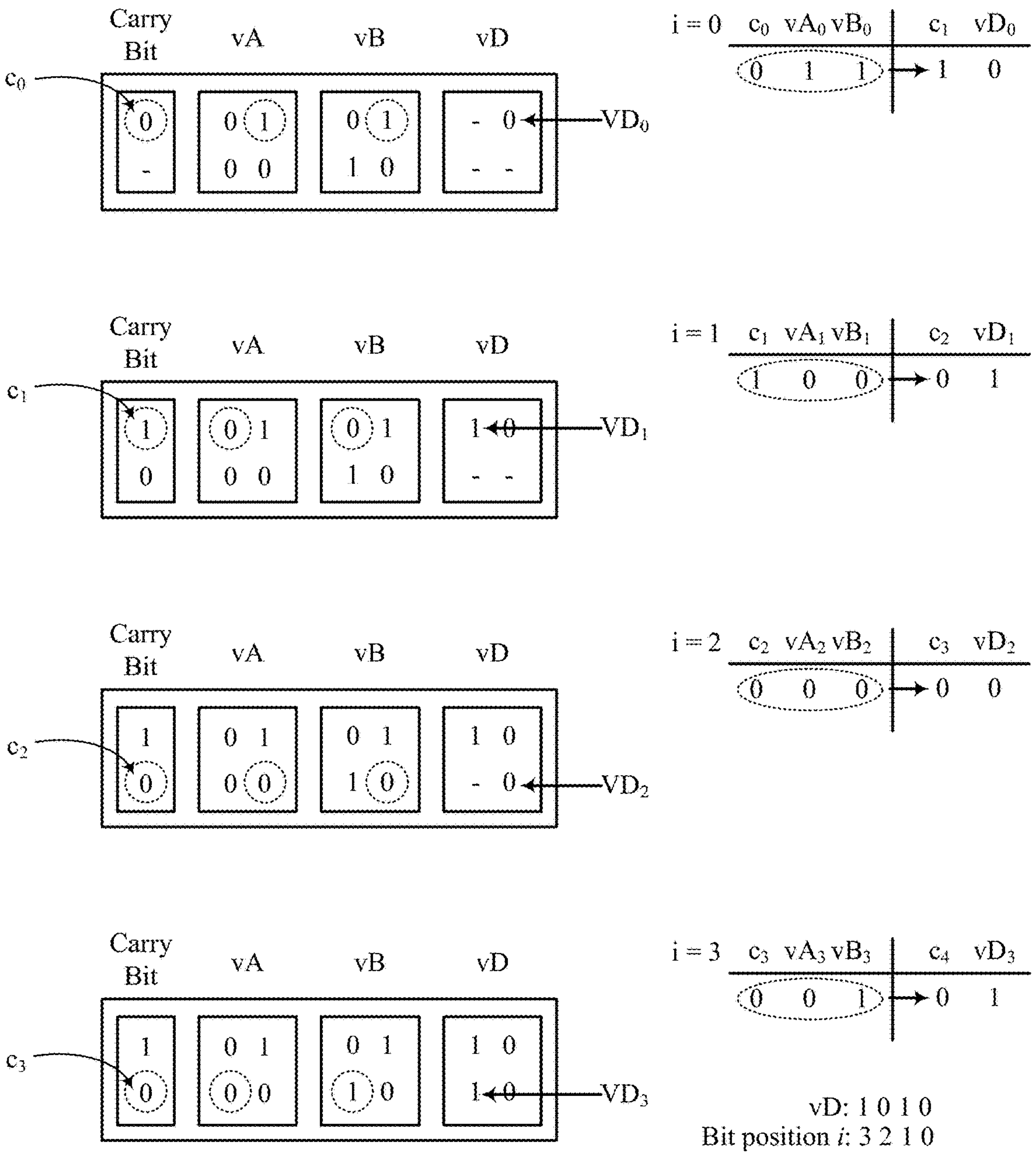
FIG. 2 illustrates an example of a vector computation that supports parity-based error management in accordance with examples as disclosed herein.

FIG. 2 illustrates an example of a vector computation 200 that supports parity-based error management in accordance with examples as disclosed herein. The vector computation 200 may be an example of vector addition and may be performed on operand vectors vA and vB, which may be stored in memory cells (e.g., CAM cells) of a plane of an APM device. The result of the vector addition may be vector vD. Each operand vector may include four bits (e.g., the operand vectors may include a single 4-bit element), and the position of each bit may be denoted i. The operand vectors may be stored in planes of an APM device as discussed with reference to FIG. 1 and may be associated with a set of vector instructions such as RISC-V vector instructions. The vector computation 200 may be performed using truth table 205, which may be the truth table for adding two bits and a potential carry bit. The truth table 205 may be stored in a memory coupled with or included in the APM device, and entries (e.g., rows) of the truth table 205 may be compared to operand bits of the vectors vA and vB using CAM techniques.

The provided example of using associative processing for computational operations on vectors is for illustrative purposes only and is not limiting in any way.

To perform the addition of the vector vA and the vector vB using associative processing, the APM device may retrieve (e.g., using a sequencer) entries of the truth table 205 from memory and compare (e.g., in-situ using CAM techniques) the entries with operand bits of vectors vA and vB. Upon finding a match, the APM device may write the corresponding result (e.g., vDi and carry bit $c_{i+1}$) for the matching entry to the plane storing the vectors (or a different plane) before moving on to the next significant operand bits of the vectors.

For example, for i=0, the APM device may compare the entries of the truth table 205 with the corresponding operand bits (e.g., $c_0$=0, $vA_0$=1, and $vB_0$=0) from vectors vA and vB. Upon detecting a match between the operand bits and an entry of the truth table 205, the APM device may write the result corresponding to the matching entry (e.g., $vD_0$=0 and carry bit $c_1$=1) to the plane storing the operand vectors (or a device may compare the entries from the truth table 205 with the operand bits for i=0 in a serial manner (e.g., starting with the top entry and moving down the truth table 205 one entry at a time). In some examples, the APM device may compare entries from the truth table 205 with multiple operand bits in parallel (e.g., concurrently).

After determining the result for the ith operand bits, the APM device may proceed to the next significant operand bits (which may include the carry bit i+1 carry bit determined from the ith operand bits). For instance, after determining the result for the i=0 operand bits, the APM device may proceed to the i=1 operand bits (which may include the carry bit $c_1$ determined from the i=0 operand bits). However, in some scenarios (e.g., when the computational operation is a logic operation) the APM device may perform computational operations on some or all of the operand bits in parallel.

For i=1, the APM device may compare the entries of the truth table 205 with the corresponding operand bits (e.g., $c_1$=1, $vA_1$=0, and $vB_1$=0) from vectors vA and vB. Upon detecting a match between the operand bits and an entry of the truth table 205, the APM device may write the result corresponding to the matching entry (e.g., $vD_1$=1 and carry bit $c_2$=0) to the plane storing the operand vectors (or a different plane). The APM device may compare the entries from the truth table 205 with the operand bits for i=1 in a serial manner (e.g., starting with the top entry and moving down the truth table 205 one entry at a time). After determining the result for the i=1 operand bits, the APM device may proceed to the i=2 operand bits (which may include the carry bit $c_2$ determined from the i=1 operand bits).

For i=2, the APM device may compare the entries of the truth table 205 with the corresponding operand bits (e.g., $c_2$=0, $vA_2$=0, and $vB_2$=0) from vectors vA and vB. Upon detecting a match between the operand bits and an entry of the truth table 205, the APM device may write the result corresponding to the matching entry (e.g., $vD_2$=0 and carry bit $c_3$=0) to the plane storing the operand vectors (or a different plane). The APM device may compare the entries from the truth table 205 with the operand bits for i=2 in a serial manner (e.g., starting with the top entry and moving down the truth table 205 one entry at a time). After determining the result for the i=2 operand bits, the APM device may proceed to the i=3 operand bits (which may include the carry bit $c_3$ determined from the i=2 operand bits).

For i=3, the APM device may compare the entries of the truth table 205 with the corresponding operand bits (e.g., $c_3$=0, $vA_3$=0, and $vB_3$=1) from vectors vA and vB. Upon detecting a match between the operand bits and an entry of the truth table 205, the APM device may write the result corresponding to the matching entry (e.g., $vD_3$=1 and carry bit $c_4$=0) to the plane storing the operand vectors (or a different plane). The APM device may compare the entries from the truth table 205 with the operand bits for i=3 in a serial manner (e.g., starting with the top entry and moving down the truth table 205 one entry at a time).

Thus, the APM device may use associative processing to determine that adding vA (e.g., 0b0001) and vB (e.g., 0b1001) results in vD=0b1010. After completing the addition operation, the APM device may communicate the vector vD to a host device, use the result vector vD to perform other computational operations, or a combination thereof.

Although an APM device may perform a computational operation on a serial bit-by-bit basis, latency may be reduced if the APM device performs the computational operation on different sets of bits in parallel. For example, if vector vA has a vector element length of sixteen bits, the APM device may divide each vector into four sets of consecutive bits and perform the computational operation on each set of consecutive bits in parallel (but within a set the computational operation may be performed on a serial bit-by-bit basis, as described with reference to FIG. 2). For example, the APM device may perform the computational operation on Set A (bits 0-3), Set B (bits 4-7), Set C (bits 8-11) and Set D (bits 12-15) in parallel, but within each set the APM device may perform the computation operation on a bit-by-bit basis. To account for arithmetic output bits (e.g., carry bits, borrow bits), the APM device may redundantly perform each computational operation using different values for the arithmetic output bits. The APM device may then select the correct results from the redundant computational operations based on the actual value of the arithmetic bit computed by the planes storing less significant bits.

In some examples, the associative processing techniques described herein may be applied to one or more parity bits for operands as part of carrying through the one or more parity bits. For example, referring to vector computation 200, the APM device may use the truth table 205 (which is one example format of information that can be used) to perform an addition computation on one or more parity bits for vector vA and on one or more parity bits for vector vB. The APM device may then use the resulting parity bit(s) to perform error detection, and possibly error correction, on vector vC.

Figure 3:
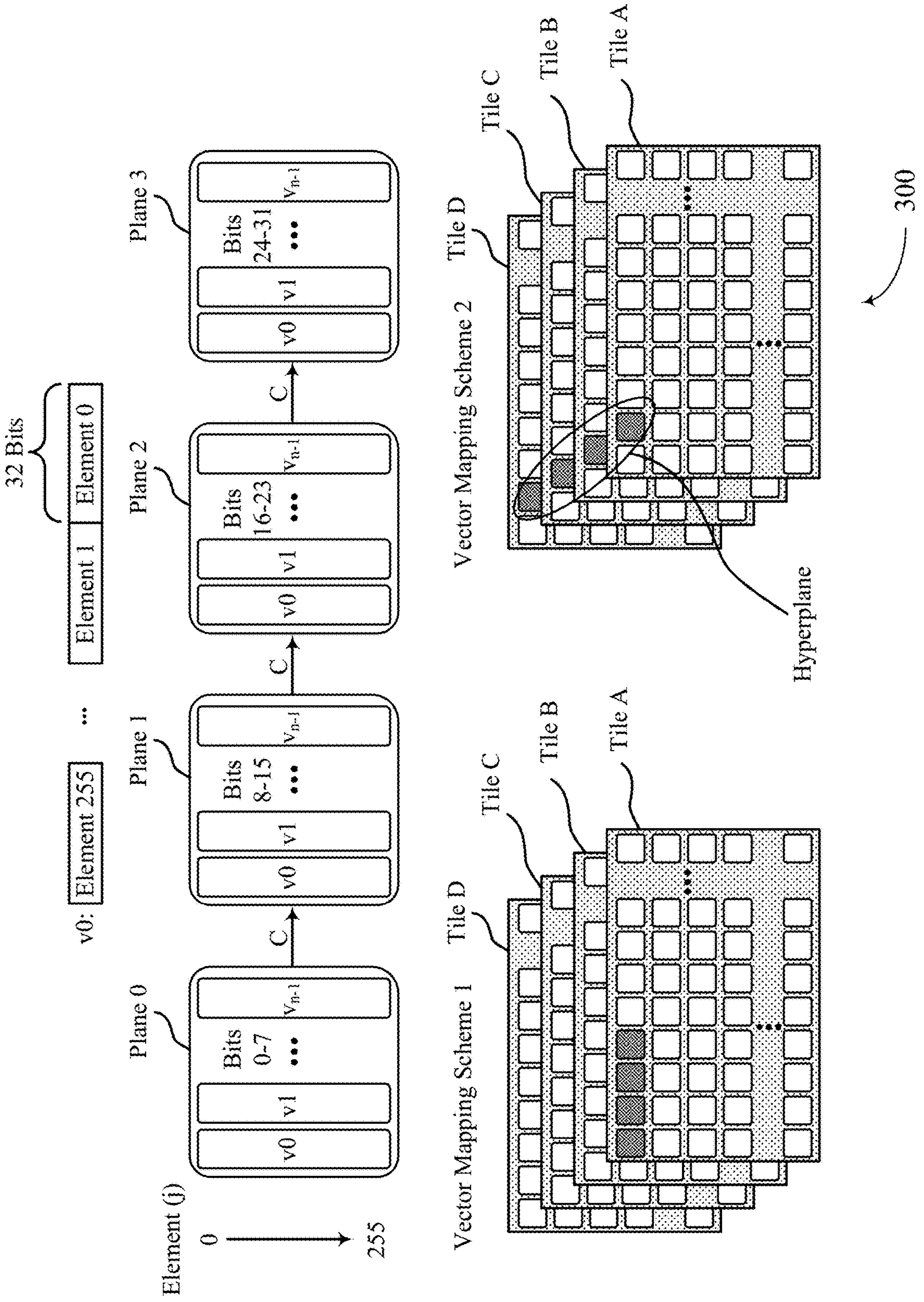
FIG. 3 illustrates an example of planes that support redundant computing and parity-based error management in accordance with examples as disclosed herein.

FIG. 3 illustrates an example of planes 300 that support redundant computing and parity-based error management in accordance with examples as disclosed herein. The planes 300 may be examples of planes 145 as described with reference to FIG. 1. Thus, the planes 300 may be configured to store vectors for computational operations that are performed using associative processing. In some examples, the planes 300 may be in the same tile, as discussed with reference to vector mapping scheme 1. In other examples, the planes 300 may be in different tiles, as discussed with reference to vector mapping scheme 2.

In the given example, n vectors with multiple (e.g., 256) multi-bit elements (e.g., 32-bit elements) are mapped to four planes. However, other quantities of these factors are contemplated and within the scope of the present disclosure. Although described with reference to vectors, other types of operands may be stored in the planes 300. Additionally, the planes may store parity bits for one or more of the operands.

An APM device may map and write n vectors, denoted v0 though $v_{n-1}$, to four planes. The quantity of planes to which vectors are mapped may be a function of the element length and the quantity of bits mapped to each plane. For example, the quantity of planes to which a vector is mapped may be equal to the element length divided by the quantity of bits mapped to each plane. In the given example, the quantity of planes to which the vectors are mapped is four, which is equal to the element length (e.g., 32) divided by the quantity of bits mapped to each plane (e.g., eight).

At least some if not each plane may store a set of contiguous bits from at least some if not each element of at least some if not each vector (e.g., each plane may store a corresponding set of contiguous bits from each element of each vector). For instance, plane 0 may store contiguous bits 0-7 for each element of each vector; plane 1 may store contiguous bits 8-15 for each element of each vector; plane 2 may store contiguous bits 16-23 for each element of each vector; and plane 3 may store contiguous bits 24-31 for each element of each vector. The bits of different vectors may be stored across different columns of the planes, whereas the bits of different elements may be stored across different rows of the planes. For example, the bits from vector 0 may be stored in the first set of eight columns of each plane; the bits from vector 1 may be stored in the second set of eight columns of each plane; the bits from vector 2 may be stored in the third set of eight columns of each plane; and so on and so forth. For each vector, the bits from element 0 may be stored in the first row of a given plane; the bits from element 1 may be stored in the second row of the plane; the bits from element 2 may be stored in the third row of the plane, and so on and so forth.

So, a plane that has x rows (e.g., 256 rows) may be capable of storing vectors with x elements or fewer (vectors with length 256 or less). If a vector has more than x elements, the elements of the vector may be split across multiple planes (e.g., the elements of a vector with length 512 may be stored in two planes, with the first plane storing bits from the first 256 elements and the second plane storing bits from the second 256 elements). So, a system that uses the vector mapping schemes described herein may support vectors with larger sizes than other systems (e.g., serial processing systems) which may be constrained by the size of processing circuitry (e.g., compute engines).

Vectors may be stored according to vector mapping scheme 1 or vector mapping scheme 2. In vector mapping scheme 1, the planes to which a vector is mapped may be in the same tile. For example, plane 0 through plane 3 may be in tile A. In vector mapping scheme 2, the planes to which a vector is mapped may be in different tiles. For example, plane 0 may be in tile A, plane 1 may be in tile B, plane 2 may be in tile C, and plane 3 may be in tile D. Collectively, tiles A through D (e.g., the tiles across which a vector is spread) may be referred to a hyperplane. Both vector mapping schemes may allow an APM device to perform computational operations on multiple vectors in parallel (e.g., during partially or wholly overlapping times). For example, given h tiles, the APM device may perform h different computational operations at once.

So, in vector mapping scheme 1, an APM device may use a single tile to complete a computational operation on a vector. For instance, the APM device may use tile A to perform the computational operation on bits 0-7 of the elements in the vector, may use tile A to perform the computational operation on bits 8-15 of the elements in the vector, may use tile A to perform the computational operation on bits 16-23 of the elements in the vector, and may use tile A to perform the computational operation on bits 24-31 of the elements of the vector. If carry bits arise from the computational operations, the APM device may pass the carry bits (denoted 'C') between the planes of tile A. For example, if a carry bit results from the computational operation on bits 0-7, the APM device may pass that carry bit from plane 0 to plane 1 in tile A.

In vector mapping scheme 2, an APM device may use multiple tiles to complete a computational operation on a vector. For instance, the APM device may use tile A to perform the computational operation on bits 0-7 of the elements in the vector, may use tile B to perform the computational operation on bits 8-15 of the elements in the vector, may use tile C to perform the computational operation on bits 16-23 of the elements in the vector, and may use tile D to perform the computational operation on bits 24-31 of the elements in the vector. If carry bits arise from the computational operations, the APM device may pass the carry bits between the tiles. For example, if a carry bit results from the computational operation on bits 0-7, the APM device may pass that carry bit from tile A to tile B.

The associative processing techniques described herein may be implemented by logic at an APM system, by logic at an APM device, or by logic that is distributed between the APM system and the APM device. The logic may include one or more controllers, access circuitry, communication circuitry, or a combination thereof, among other components and circuits. The logic may be configured to perform aspects of the techniques described herein, cause components of the APM system and/or the APM device to perform aspects of the techniques described herein, or both.

An APM device may be capable of performing computational operations serially (e.g., in a serial mode) or in parallel (e.g., in a parallel mode). If the APM device performs a computational operation serially, the APM device may perform the computational operation on one plane at a time in sequence (e.g., starting with the least significant plane, e.g., plane 0, and ending with the most significant plane, e.g., plane 3). The APM device may perform the computational operation on one plane at a time because the computational operation on plane n may depend on arithmetic output bits that result from the computational operation on plane n−1. But, in some examples, performing a computational operation on one plane at a time may increase latency, among other disadvantages.

According to the techniques described herein, an APM device may reduce latency by performing computational operations in parallel across planes. To do so, in some examples, the APM device may use respective redundant planes for plane 1, plane 2, and plane 3. The redundant planes may store the same bits for the computational operation as plane 1, plane 2, and plane 3. The APM device may use a first possible value (e.g., 0) for arithmetic output bits for plane 1, plane 2, and plane 3, and may use a second possible value (e.g., 1) for arithmetic output bits for the redundant planes. By using different values for the arithmetic output bits, the APM device may perform computational operations on all of the planes (e.g., plane 0 through plane 3, and the redundant planes) without waiting for the computational operation on one or more other planes (e.g., a preceding plane) to finish. After performing the computational operations, the APM device may determine the actual (e.g., computed) values for the arithmetic output bits and select the results of the computational operations from the planes used the correct possible values for the arithmetic output bits.

In some examples, the APM device may carry through one or more parity bits for each plane, as described herein, so that the APM device can detect and correct errors in the resulting vector from the set planes that used the actual (e.g., computed) values for the arithmetic output bits.

Figure 4:
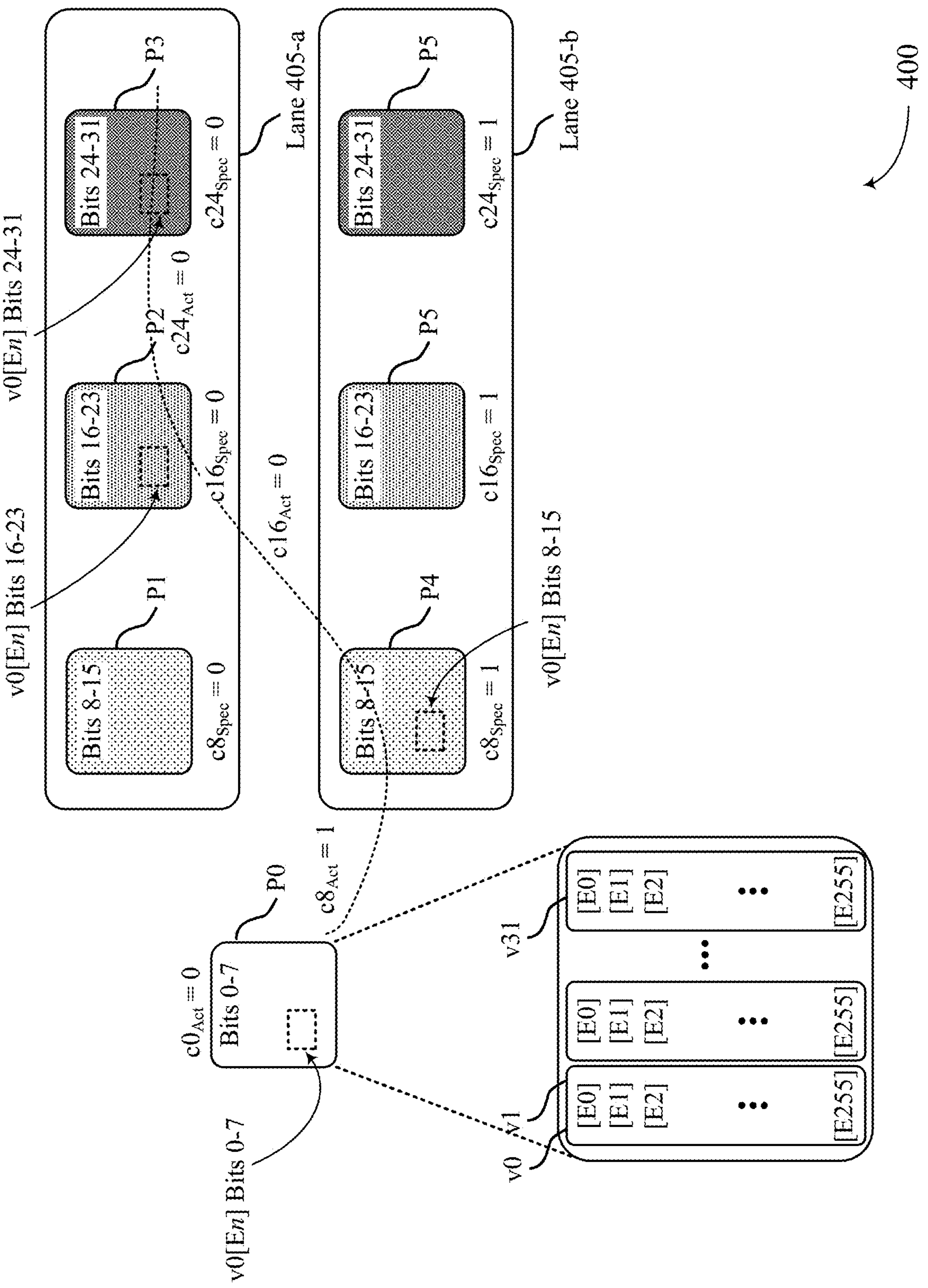
FIG. 4 illustrates an example of planes that support redundant computing and parity-based error management in accordance with examples as disclosed herein.

FIG. 4 illustrates an example of planes 400 that support redundant computing and parity-based error management in accordance with examples as disclosed herein. The planes 400 may include planes P0 through P6. Plane P4 may be redundant with plane P0, which means that plane P4 stores the same operand vector element(s) for a computational operation as plane P0. Similarly, P5 may be redundant with plane P1 (such that plane P5 stores the same operand vector element(s) for the computational operation as plane P2), and plane P6 may be redundant with plane P3 (such that plane P6 stores the same operand vector element(s) for the computational operation as plane P3). Planes that store the same operand vector elements for a computational operation may be referred to as sister planes or redundant planes, and are shown with matching shading in FIG. 4. Planes P1, P2, and P3 may form a first lane of planes (lane 405-*a*) and planes P4, P5, and P6 may form a second lane of planes (lane 405-*b*). The planes P0 through P6 may be in the same tile (e.g., in accordance with Layout 1) or in different tiles (e.g., in accordance with Layout 2). For example, each plane may be in Tile A, or the planes may be distributed across tiles so that each plane is in a respective tile.

Each plane may store sets of contiguous bits for elements of vectors. For example, plane P0 may store contiguous bits 0-7 for each element of vectors v0 through v31. Plane P1 and plane P4 may each store contiguous bits 8-15 for each element of vectors v0 through v31. Plane P2 and plane P5 may each store contiguous bits 16-23 for each element of vectors v0 through v31. And plane P3 and plane P6 may each store contiguous bits 24-31 for each element of vectors v0 through v31. Although shown with 32 vectors, 256 elements per vector, and 8 bits per element, other quantities of vectors, elements, and bits are contemplated and within the scope of the present disclosure.

The APM device that includes planes P0 through P6 may use redundant computing to decrease the latency of computational operations. For example, the APM device may use redundant computing to reduce the latency of a computational operation (e.g., an addition operation) on operand vectors v0 and v1. For case of illustration, the computational operation is described with reference to a single element of vector v0. However, the techniques described herein may be extended to multiple elements of vectors v0 and v1, including all the elements of vectors v0 and v1. Although described with reference to two operand vectors (v0 and v1), the techniques described herein may be implemented for any quantity of operand vectors.

To perform redundant computing, the APM device may use a first value (e.g., 0) for speculative carry bits that act as input bits for planes P0, P1, and P2. The APM device may use a second value (e.g., 1) for speculative carry bits that act as input bits for planes P4, P5, and P6. The speculative carry bit for a plane may represent the actual carry bit from a less significant plane in a lane 405 of planes and may be assigned a possible value for the actual carry bit. For example, the speculative carry bits $c\mathbf{8}_{Spec}$ may represent the actual carry bits from bits 0-7, the speculative carry bits $c\mathbf{16}_{Spec}$ may represent the actual carry bits from bits 8-15, and the speculative carry bit $c\mathbf{24}_{Spec}$ may represent the actual carry bits from bits 16-23. The actual carry bit for a plane may refer to the carry bit that is determined based on the bits in the preceding (e.g., less significant) plane, as opposed to a speculative carry bit which is set to one of two possible values irrespective of the bits in the preceding plane. The actual carry bits $c\mathbf{8}_{Act}$, $c\mathbf{16}_{Act}$, and $c\mathbf{24}_{Act}$ may be referred to as output bits or arithmetic output bits. Although described with reference to carry bits, the APM device may use redundant computing as described herein for other types of arithmetic output bits.

By using speculative carry bits and redundant planes, the APM device may perform the computational operation on each plane in parallel (e.g., concurrently, at wholly or partially overlapping times). Specifically, the APM device may use actual carry bit c0 (denoted $c\mathbf{0}_{ACT}$) to perform the computational operation on bits 0-7 of element n (denoted [En]) for vector v0 in plane 0. Concurrently, the APM device may: 1) use speculative carry bit $c\mathbf{8}_{Spec}=0$ (e.g., a first possible value for $c\mathbf{8}_{Act}$) to perform the computational operation on bits 8-15 of element n for vector v0 in plane 1, and 2) use speculative carry bit $c\mathbf{8}_{Spec}=1$ (e.g., a second possible value for $c\mathbf{8}_{Act}$) to perform the computational operation on bits 8-15 of element n for vector v0 in plane 4. Also concurrently, the APM device may: 1) use speculative carry bit $c\mathbf{16}_{Spec}=0$ (e.g., a first possible value for $c\mathbf{16}_{Act}$) to perform the computational operation on bits 16-23 of element n for vector 0 in plane 2, and 2) use speculative carry bit $c\mathbf{16}_{Spec}=1$ (e.g., a second possible value for $c\mathbf{16}_{Act}$) to perform the computational operation on bits 15-23 of element n for vector v0 in plane 5. Also concurrently, the APM device may: 1) use speculative carry bit $c\mathbf{24}_{Spec}$=0 (e.g., a first possible value for $c\mathbf{24}_{Act}$) to perform the computational operation on bits 24-31 of element n for vector v0 in plane 3, and 2) use speculative carry bit $c\mathbf{24}_{Spec}$=1 (e.g., a second possible value for $c\mathbf{24}_{Act}$) to perform the computational operation on bits 24-31 of element n for vector v0 in plane 6.

The APM device may use associative processing to perform the computational operations. For example, the APM device may search the vector operand(s) for bit values that match the entries of a truth table for the computational operation, then determine the results for the computational operation based on the corresponding results from the truth table. Thus, the APM device may perform the computational operations based on a capability (e.g., the search-and-replace capability) of the content-addressable memory cells used to store the vector operands.

After performing the computational operation for a plane the APM device may store the results of the computational operation, for example, in that plane. For example, the APM device may store the results from the computational operation on bits 0-7 in the content-addressable memory cells for vector v31 in plane P0. And so on and so forth for the other planes. In some examples, the APM device may also store the actual carry bits from a plane in the plane (or a local register or other storage device) for later use (e.g., for use during reconstruction).

Thus, unlike in serial computing, the APM device may perform the computational operation on a pair of sister planes before finishing the computational operations on less significant pairs of sister planes, which may decrease latency. However, one plane per sister pair will likely have incorrect results, because only one of the sister planes per pair will have used a speculative carry bit with the correct value (e.g., only one plane will have used a possible value for the actual carry bit $c_{Act}$ that matches the value of the actual carry bit $c_{Act}$). For instance, if the actual carry bit $c\mathbf{8}_{Act}$ is equal to 1, plane P4 will have the correct results for the computational operation on bits 8-15 (because plane P4 used the $c\mathbf{8}_{Spec}$=1, which matches $c\mathbf{8}_{Act}$) and plane P1 will have incorrect results (because plane P1 used $c\mathbf{8}_{Spec}$=0, which does not match $c\mathbf{8}_{Act}$).

So, only one sister plane may store the correct results for the computational operation on an element of a vector. To illustrate, consider the example in which $c\mathbf{8}_{Act}$=1, $c\mathbf{16}_{Act}$=0, and $c\mathbf{24}_{Act}$=0 (e.g., for element n). In this example, the planes with the correct results (as indicated by the dotted line) for element n of vector v0 are plane P4 (which used $c\mathbf{8}_{Spec}$=1), plane P2 (which used $c\mathbf{16}_{Spec}$=0), and plane P3 (which used $c_{Spec}24$=0). Put another way, the sister plane with the correct result for a redundant computational operation may be the plane whose possible value matches (e.g., is equal to) the value for the actual carry bit.

Although described with reference to a single element n, the planes 400 may implement redundant computing for each element in the operand vector(s). So, a given sister plane may have correct results for some vector elements but incorrect results for other vector elements (e.g., $c\mathbf{8}_{Act}$ may be equal to 0 for element j but may be equal to 1 for element k, resulting in a correct result for element j in plane P0 but an incorrect result for element k in plane P0). To ensure that at least one plane per sister pair has the correct results for each element, the APM device may copy the correct results from one sister plane to the other sister plane, as described in more detail with reference to FIG. 5. Copying correct results between planes (or flagging the correct results across planes) may be referred to as reconstruction. Copying correct results between planes may include to reading the correct results from one sister plane and writing the correct results to the other sister plane.

Thus, the APM device may use redundant computing to perform a computational operation across multiple planes in parallel. In some examples, the APM device may carry through parity bits so that the APM device can determine which one or more planes, if any, have one or more errors in the result from the computational operation.

In some examples, the APM device may perform additional redundant computational operations using the same value for the arithmetic output bits. For example, the APM device may use an additional set of planes and the first value (e.g., 0) for speculative carry bits to redundantly perform the computational operation on vectors v0 and v1. And the APM device may use another additional set of planes and the second value (e.g., 1) for speculative carry bits to redundantly perform the computational operation on vectors v0 and v1. In addition to performing the computational operation on the vectors v0 and v1, the APM device may also use the additional sets of planes to perform the computational operation on parity bits for the planes. The APM device may then use the resulting parity bits for the planes that used the actual values for the arithmetic bits to determine the planes that have the smallest quantity of errors (e.g., so that the APM device can select those planes for additional operations).

Figure 5:
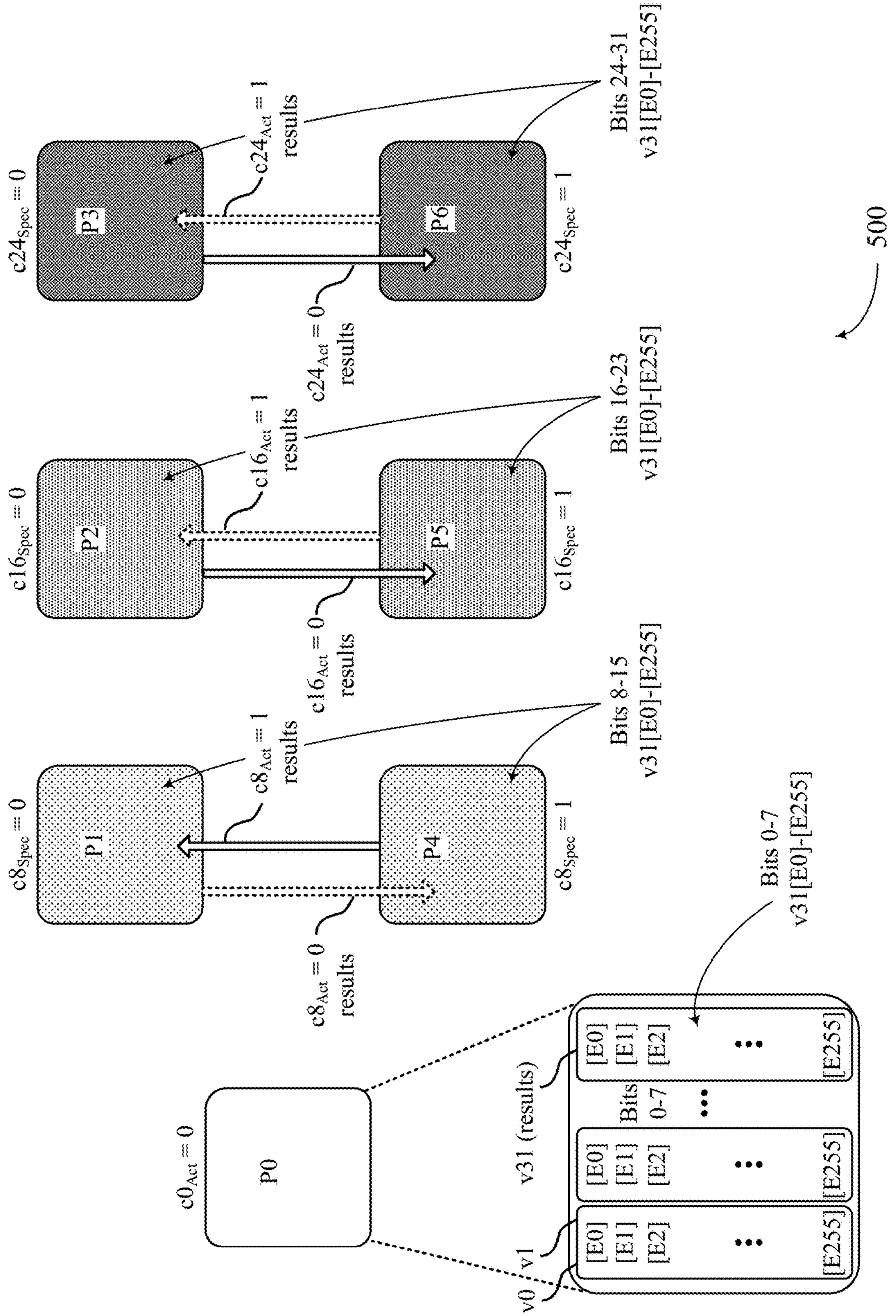
FIG. 5 illustrates an example of planes that support redundant computing and parity-based error management in accordance with examples as disclosed herein.

FIG. 5 illustrates an example of planes 500 that support redundant computing and parity-based error management in accordance with examples as disclosed herein. The planes 500 may include planes P0 through P6, which may be examples of planes P0 through P6 after performing a computational operation on operand vectors v0 and v1 as described with reference to FIG. 5. For instance, planes P0 through P6 may include portions of vector 31, which may represent the results of the computational operations described with reference to FIG. 5.

So, bits 0-7 of the elements of vector v31 in plane P0 may represent the results of the computational operation on bits 0-7 of the elements of operand vectors v0 and v1. In sister planes P1 and P4, bits 8-15 of the elements of vector v31 may represent the respective results of the computational operations on bits 8-15 of the elements of operand vectors v0 and v1 (e.g., plane P1 may store the results that are based on $c\mathbf{8}_{Spec}$=0 (a first possible value for $c\mathbf{8}_{Act}$) and plane P4 may store the results that are based on $c\mathbf{8}_{Spec}$=1 (a second possible value for $c\mathbf{8}_{Act}$)). In sister planes P2 and P5, bits 16-23 of the elements of vector v31 may represent the respective results of the computational operations on bits 16-23 of the elements of operand vectors v0 and v1 (e.g., plane P2 may store the results that are based on $c\mathbf{16}_{Spec}$=0 (a first possible value for $c\mathbf{16}_{Act}$) and plane P5 may store the results that are based on $c\mathbf{16}_{Spec}$=1 (a second possible value for $c\mathbf{16}_{Act}$)). And in sister planes P3 and P4, bits 24-31 of the elements of vector v31 may represent the respective results of the computational operations on bits 24-31 of the elements of operand vectors v0 and v1 (e.g., plane P3 may store the results that are based on $c\mathbf{24}_{Spec}$=0 (a first possible value for $c\mathbf{24}_{Act}$) and plane P6 may store the results that are based on $c\mathbf{24}_{Spec}$=1 (a second possible value for $c\mathbf{24}_{Act}$)).

The results of each computational operation may be stored in the planes P0 through P6. However, as noted, it is likely that at least some results in each plane will be incorrect. To ensure that at least one sister plane has the correct results for each element, the APM device may read correct results from one sister plane and write them to the other sister plane. For example, if plane P4 stores the correct result for element 17, the APM device may read the correct result from element 17 in plane P4 and write the correct results to element 17 in P1 (thus overwriting the incorrect result for element 17 in P1).

The APM device may determine which results are correct by comparing the value of the actual carry bit for an element with the value used for the speculative carry bit for that element. For example, the APM device may determine that the result for an element is the correct result if the result was computed using a speculative carry bit value that matches (e.g., is equal to) the value of the actual carry bit for that element. To illustrate, if the actual carry bit $c8_{Act}$ for an element has a value equal to 1, the APM device may determine that the correct results for the element are in plane P4 (because plane P4 used $c8_{Spec}=1$).

In some examples, the APM device may copy the correct results in a single direction for a pair of sister planes (e.g., from one sister plane to the other, but not vice versa). For example, the APM device may copy the correct results from plane P4 to plane P1, but not from plane P1 to plane P4. Copying correct results in a single direction for a pair of sister planes may reduce reconstruction latency (e.g., the amount of time it takes to fill one of the sister planes with correct results) relative to other techniques but may leave one sister plane with incorrect results for some elements. In other examples, the APM device may copy the correct results in both directions (e.g., the correct results from each plane may be copied to the other plane). For example, the APM device may copy the correct results from plane P4 to plane P1 as well as the correct results from plane P1 to plane P4. Copying correct results in both directions for a pair of sister planes may ensure that each sister plane has correct results for each element but may increase reconstruction latency relative to other techniques.

If the APM device copies correct results in a single direction for a pair of sister planes, the APM device may select the direction based on the ratio of elements with correct results to elements with incorrect results. For example, the APM may determine the sister plane with the lowest ratio of correct results to incorrect results as the donating plane, where a donating plane is the plane from which correct results are copied. By selecting the sister plane with the lowest ratio of correct results to incorrect results as the donating plane, the APM device may decrease the reconstruction latency relative to using the other sister plane as the donating plane (because fewer elements need to be copied). For example, if plane P4 has 56 correct results and plane P1 has 200 correct elements, the APM device may reduce reconstruction time by copying the 56 correct results from plane P4 to plane P1 (compared to copying correct results from plane P1 to plane P4).

Rather than copy correct results between sister planes, the APM device may, in some examples, copy correct results from each pair of sister planes to a new plane. For example, the APM device may copy the correct results from plane P1 and plane P4 to a new plane P7 (not shown). Similarly, the APM device may copy the correct results from plane P2 and plane P5 to a new plane P8 (not shown). And the APM device may copy the correct results from plane P3 and plane P6 to a new plane P9 (not shown). Alternatively, the APM device may copy the correct results from each pair of sister planes to a different pair of sister planes. For example, the APM device may copy the correct results from plane P1 and plane P4 to plane P2 and/or plane P5. Similarly, the APM device may copy the correct results from plane P2 and plane P5 to plane P3 and/or plane P6. And the APM device may copy the correct results from plane P3 and plane P6 to plane P1 and plane P4.

In some examples, the APM device may copy the results between planes on a bit-serial row-parallel basis. For example, the APM device may copy (in parallel) the least significant bit from each correct element in a sister plane to the other sister plane, then copy (in parallel) the next significant bit from each correct element, and so on and so forth. Alternatively, the APM device may copy the results between planes on bit parallel, row-serial basis. For example, the APM device may copy (in parallel) the bits from the least significant correct element in a sister plane to the other sister plane, then copy (in parallel) the bits from the next significant correct element, and so on and so forth.

Thus, the APM device may collect the corrects results for a computation operation in one or more planes by copying the correct bits between planes. Alternatively, the APM device may reconstruct the correct results by flagging the correct bits in each plane (rather than copying the correct bits between planes). This way, the APM device can reference the flags to determine the correct bits in each plane to operate during a subsequent operation.

If referred to in the context of redundant computing, the term "correct results" may refer to the results of a computational operation that were calculated using the correct (e.g., actual, computed) value for the arithmetic output bits (e.g., carry bits). However, the correct results from a redundant computation may nevertheless have one or more errors that arise from one or more operations, such as storage or sensing. To enable detection of one or more errors in a vector that results from a computational operation on a set of operands, an APM device may perform a computational operation (which may be the same computational operation as that performed on the set of operands) on the parity bit(s) for the operands.

Figure 6:
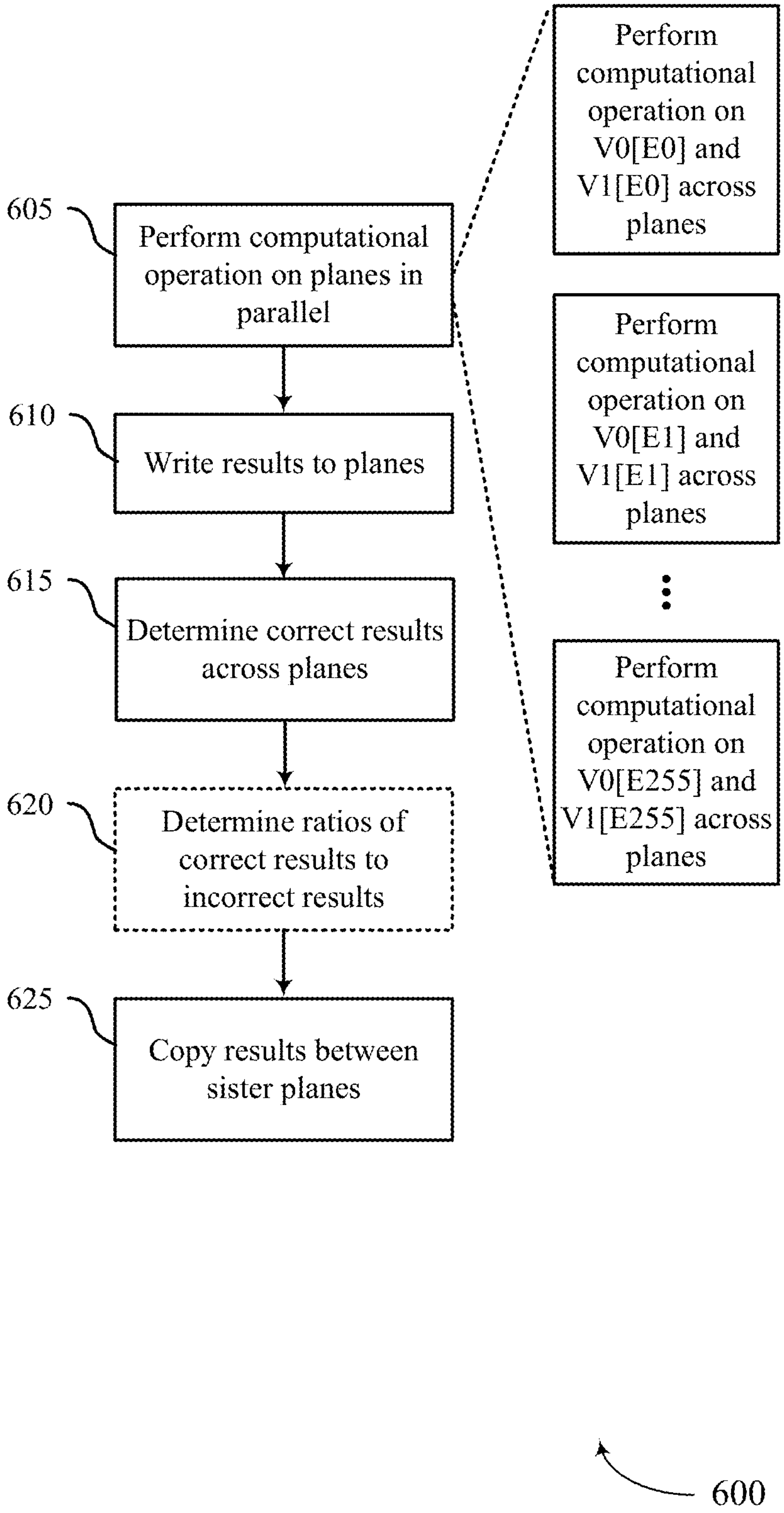
FIG. 6 illustrates an example of a process flow that supports redundant computing and parity-based error management in accordance with examples as disclosed herein.

FIG. 6 illustrates an example of a process flow 600 that supports redundant computing and parity-based error management in accordance with examples as disclosed herein. The process flow 600 may be implemented by an APM system or an APM device as described herein.

At 605, the APM device may perform (e.g., using associative processing) a computational operation on a set of operand vectors (e.g., v0 and v1). The APM device may perform the computational operation using a set of planes (e.g., planes P0 through P6) as described with reference to FIG. 4. For example, the APM device may perform the computational operation in some planes (e.g., planes P1, P2, and P3) using a first possible value for actual carry bits (e.g., $c_{Spec}=0$) and may perform the computational operation in other planes (e.g., planes P4, P5, and P6) using a second possible value for the actual carry bits (e.g., $c_{Spec}=1$).

The APM device may perform the computational operation across the set of planes on an element-by-element basis. For example, the APM device may concurrently perform the computational operation on element 0 (denoted E[0]) in each plane of the set of planes. The APM device may then concurrently perform the computational operation on element 1 (denoted [E1]) in each plane of the set of planes. And so on and so forth. Thus, the APM device may, in some examples, perform the computational operation on the elements in a serial manner but may perform the computational operation on planes in a parallel manner. Performing the computational operation on the vectors may allow the APM device to determine the results for the computational operation on each element as well as the value of actual carry bits for the computational operation.

At 610, the APM device may write the results of the computational operations to the set of planes. For example, the APM device may write the results from plane P0 to plane P0, may write the results from plane P1 to plane P1, may write the results from plane P2 to plane P2, and so on and so forth. In some examples, the APM device may write the results for a computational operation on an element (e.g., [Ex]) before performing the computational operation on the next element (e.g., [Ex+1]. Put another way, the operations of 610 may overlap with the operations of 605.

At 615, the APM device may determine the correct results for each element across the planes. For example, the APM device may determine which of plane P0 and plane P4 has the correct results for element 0, which of plane P0 and plane P4 has the correct results for element 1, which of plane P0 and P4 has the correct results for element 2, and so on and so forth for each element and each pair of sister planes. The sister plane that used the correct possible value for the actual carry bit (e.g., $c_{Spec}=c_{Act}$) of an element may be the plane with the correct results for that element.

At 620, the APM device may determine, for one or more pairs of sister planes or for each pair of sister planes, the ratio of correct results to incorrect results. For example, the APM device may determine the ratio of correct results to incorrect results for plane P0 to be 56/200 and may determine the ratio of correct results to incorrect results for plane P1 to be 200/56. Alternatively, the APM device may determine the quantity of correct results (or the quantity of incorrect results) for each plane of a pair of sister planes.

At 625, the APM device may copy correct results between sister planes (e.g., the APM device may perform reconstruction). For example, the APM device may copy the correct results from plane P1 to plane P4. The APM device may copy the correct results from the sister plane with the lowest ratio of correct results to incorrect results (e.g., the sister plane with the fewest correct results). Alternatively, the APM device may copy the correct results from each sister plane to the other sister plane. Alternatively, the APM device may copy the correct results from each sister plane to a new plane. Alternatively, the APM device may copy the correct results from each sister plane to one or more of the sister planes in the next significant pair of sister planes.

Thus, the APM device may use redundant planes and associative processing to perform a computational operation across multiple planes in parallel, which may reduce latency. In some examples, the APM device may carry through parity bits, as described herein, so that the APM device can detect and correct one or more errors in the correct results from the redundant computing.

Figure 7:
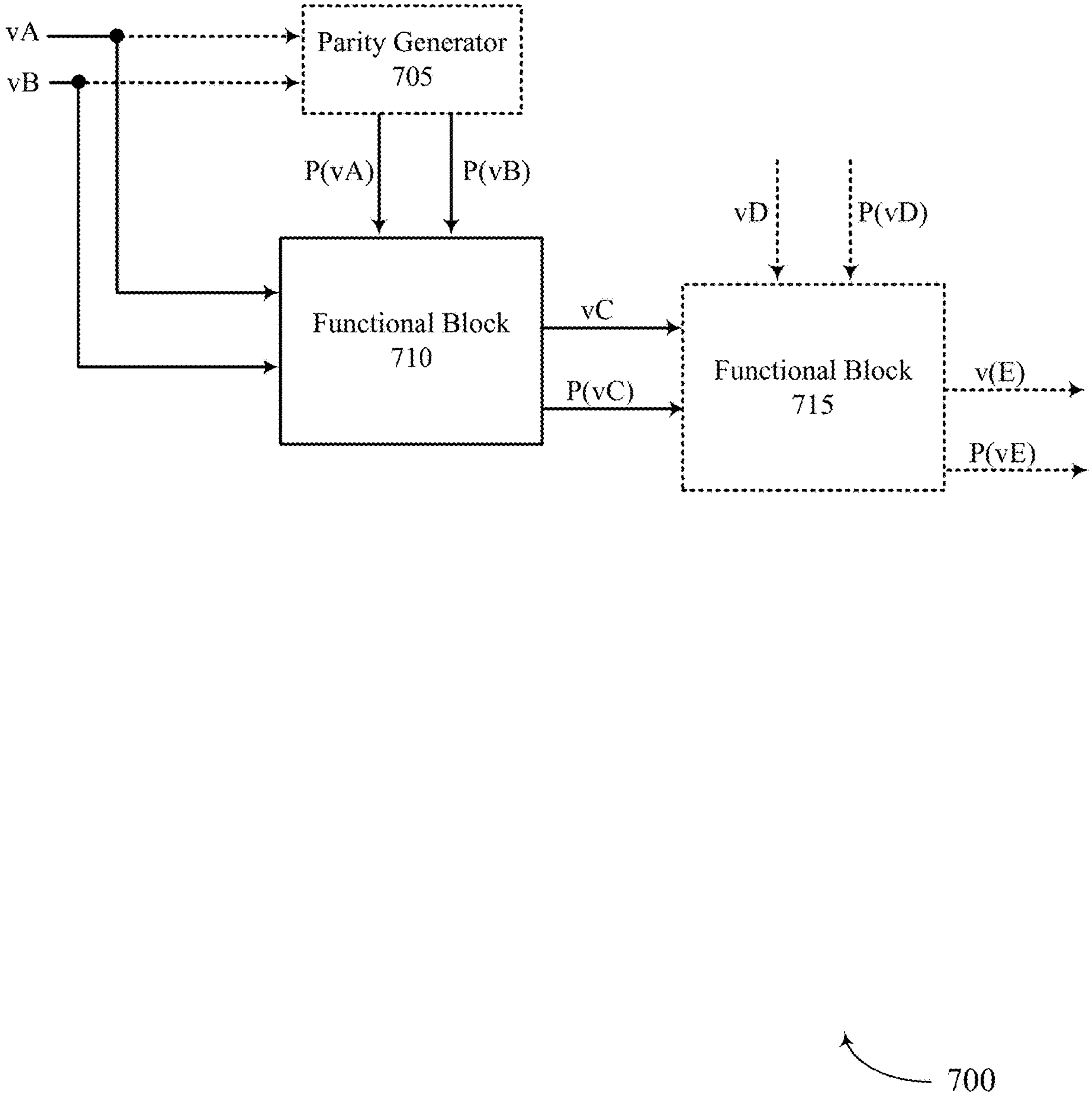
FIG. 7 illustrates an example of a processing system that supports parity-based error management in accordance with examples as disclosed herein.

FIG. 7 illustrates an example of processing system 700 that support parity-based error management in accordance with examples as disclosed herein. The processing system 700 may be included in a device, such as an APM device or another type of electronic device, that is configured to perform computational operations (e.g., arithmetic operations) on operands, such as vectors. The processing system 700 may be configured to support carrying through parity bits as described herein. The functional blocks in the processing system 700 may also be referred to as circuits, logic, engines, or other suitable terminology. In some examples, the functional blocks may be implemented using associative processing as described herein. Although described with reference to operand vectors, the techniques described herein can be implemented for other types of operands that include bit sequences.

The processing system 700 may include a parity generator 705 that is configured to generate parity bits for received operands, such as vectors. For example, the parity generator 705 may be configured to generate one or more parity bits for a first operand, such as vector vA, and may be configured to generate one or more parity bits for a second operand, such as vector vB. The parity bit(s) for vector vA may be denoted P(vA) and the parity bit(s) for vector vA may be denoted P(vB). The operand vectors may be received serially (e.g., one at a time) or in parallel (e.g., at partially or wholly overlapping times). The parity generator 705 may be configured to generate the parity bits for an operand, such as a vector, based on a linear code and thus the parity bits generated by the parity generator 705 may be examples of linear error correction codes.

The functional block 710 may be configured to perform a computational operation (e.g., arithmetic operations) on operands, such as vectors. For example, the functional block 710 may be configured to perform a computational operation on vector vA and vector vB. The functional block 710 may also be configured to perform the computational operation on the parity bits for the operands. For example, the functional block 710 may be configured to perform the computational operation on the parity bits P(vA) and P(vB). To illustrate, if the functional block 710 is configured to perform a summation operation, the functional block may be configured to: 1) sum the operands vector vA and vector vB, and 2) sum the parity bits P(vA) and P(vB). These summations can be done serially (e.g., in any order), or in parallel (e.g., wholly, or in part at least partially overlapping). The parity bits may be generated using a linear correction code so the resulting parity bit(s) for vector vC may indicate error information for the resulting vector vC. For example, depending on the power of the linear correction code, the parity bit(s) P(vC) may indicate whether vector vC has an error and, potentially, which bits of vector vC are errors.

The parity bits operated on by the functional block 710 may be received from the parity generated 705 or from another component (e.g., the component that transmitted the vectors vA and vB). The one or more components that provide the vectors vA and vB (and that potentially provide the parity bits P(vA) and P(vB) may be a host device, such as the host device 105, or a memory device, among other options. After computing vector vC and the parity bits P(vC), the functional block 710 may output the vector vC and the parity bits P(vC), which may refer to transmitting the vector vC and the parity bits P(vC) to another functional block of the processing system 700 (e.g., for one or more additional operations) or transmitting the vector vC and the parity bits P(vC) to a memory device (e.g., for storage).

In some examples, the vector vC and the parity bit(s) P(vC) may be communicated to a second functional block, such as functional block 715. The functional block 715 may be configured to perform a computational operation (e.g., arithmetic operations) on operands, such as vectors. For example, the functional block 715 may be configured to perform a computational operation on vector vC and vector vD (which may be received from another functional block or an external device such as a host device or a memory device). The functional block 715 may also be configured to perform the computational operation on the parity bits for the operands. For example, the functional block 715 may be configured to perform the computational operation on the parity bits P(vC) and P(vD). To illustrate, if the functional block 710 is configured to perform a multiplication operation, the functional block may: 1) multiply the operand vectors vC and vD and 2) multiply the parity bits P(vC) and P(vD). These multiplications can be done serially (e.g., in any order), or in parallel (e.g., wholly, or in part at least partially overlapping). Because the parity bits are a linear correction code, the resulting parity bit(s) for vector E (denoted P(vE)) may indicate error information for the resulting vector E.

To illustrate the disclosed concepts, an example of carrying through a parity bit is described. To generate the parity for vector vA, the parity generator 705 may count the quantity of bits in vector vA that are Is and generate a parity bit P(vA) that indicates whether the vector vA has an even quantity of Is or an odd quantity of 1s. For example, if the vector vA has an even quantity of Is the parity bit P(vA) may be 0 and if the vector vA has an odd quantity of Is the parity bit P(vA) may be 1. To generate the parity for vector vB, the parity generator 705 may count the quantity of bits in vector vB that are Is and generate a parity bit P(vB) that indicates whether the vector vB has an even quantity of Is or an odd quantity of Is. For example, if the vector vB has an even quantity of Is the parity bit P(vB) may be 0 and if the vector vB has an odd quantity of Is the parity bit P(vB) may be 1.

After determining the parity bits for vector vA and vector vB, the processing system 700 may perform a computational operation on vector vA and vector vB as well as P(vA) and P(vB). For example, if the computational operation is a summation operation, the processing system 700 may (via the functional block 710), sum vector vA and vector vB. The processing system 700 may also sum P(vA) and P(vB). The resulting parity bit P(vC) may indicate whether the sum of vector vA and vector vB (e.g., vector vC) should have an even quantity of Is or an odd quantity of 1s. For example, if P(vA)=0 and P(vB)=0, the parity bit p(vC) may be 0 (indicating that the vector vC should have an even quantity of 1s). If P(vA)=0 and P(vB)=1 (or if P(vA)=1 and P(vB)=0) the parity bit p(vC) may be 1 (indicating that the vector vC should have an odd quantity of 1s). If P(vA)=1 and P(vB)=1, the parity bit p(vC) may be 0 (indicating that the vector vC should have an even quantity of 1s).

To determine whether vector vC has an error, the processing system 700 may determine whether vector vC has an even quantity or an odd quantity of Is and compare the result with the parity bit P(vC). If there is a mismatch (e.g., if the parity bit P(vC) indicates that vector vC should have an even quantity of Is but vector vC actually has an odd quantity of 1s) the processing system 700 may determine that vector vC has an error.

If implemented by an associative processing system 800 as described with reference to FIG. 8, the parity bit for vector vA and the parity bit for vector vB may be determined by performing lookup procedures on the vectors while the vectors are in the planes. For example, the processing system 800 may search for a 1 on the most significant bit of vector vA and, if a 1 is detected, increment a scalar counter for vector vA. The processing system may then search for a 1 on the next most significant bit of vector vA and, if a 1 is detected, increment the scalar counter for vector vA. And so on and so forth for each bit of vector vA. After searching vector vA, the associative processing system 800 may determine the parity bit for vector vA (e.g., P(vA)) as the least significant bit of the counter for vector vA (which may indicate whether vector vA has an even quantity or an odd quantity of 1s). A similar process may be used to determine the parity bit for vector vB.

After determining the parity bits P(vA) and P(vB), the associative processing system 800 may use associative processing to perform a computational operation on vector vA and vector vB as well as P(vA) and P(vB). For example, if the computational operation is a summation operation, the processing system 800 may (using plane P0 and plane P1), sum vector vA and vector vB. The processing system 800 may also (using plane P0 and plane P1) sum P(vA) and P(vB). The resulting parity bit P(vC) may indicate whether the sum of vector vA and vector vB (e.g., vector vC) should have an even quantity of Is or an odd quantity of 1s. To determine whether vector vC has an error, the processing system 800 may determine whether vector vC has an even quantity or an odd quantity of Is and compare the result with the parity bit P(vC). If there is a mismatch (e.g., if the parity bit P(vC) indicates that vector vC should have an even quantity of Is but vector vC actually has an odd quantity of 1s) the processing system 800 may determine that vector vC has an error.

Carrying through parity bits may allow a system to avoid correcting the operand vectors (e.g., vector vA, vector vB) and instead correct the result of the computation operation. For instance, considering the example where vector vA and vector vB are operands of a vector addition and vector vC is the result, if there are a sufficient quantity of parity bits to correct both vector vA and vector vB in vector form (e.g., there is correction information per vector element), it may be possible to calculate vC using incorrect values of vector vA and vector vB, then correct vector vC using the parity bits that indicate correction information for vector vA and vector vB.

Figure 8:
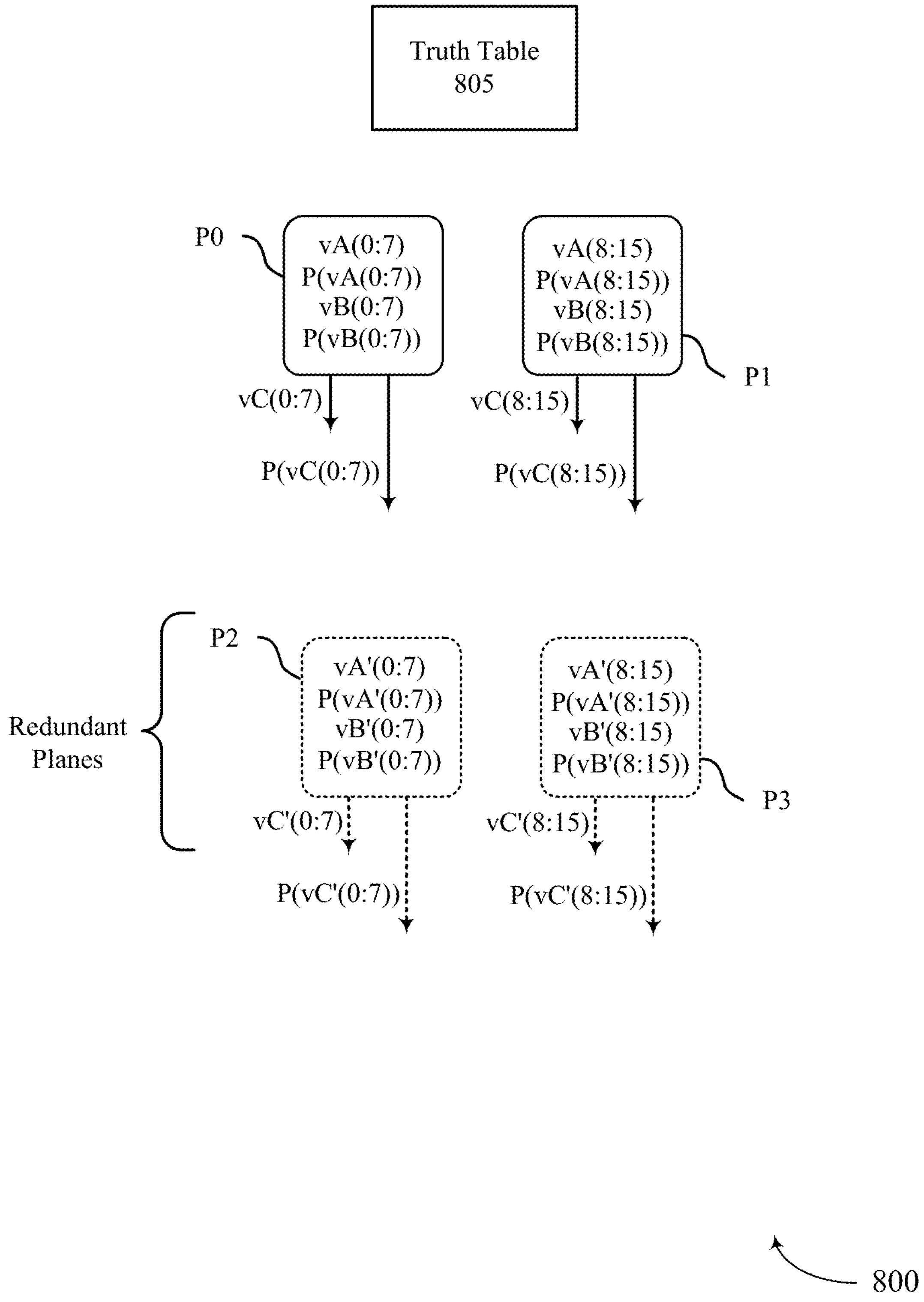
FIG. 8 illustrates an example of an associative processing memory that supports parity-based error management in accordance with examples as disclosed herein.

FIG. 8 illustrates an example of an associative processing memory system 800 that supports parity-based error management in accordance with examples as disclosed herein. The associative processing memory system 800 may be included in a device, such as an APM device, that is configured to perform computational operations (e.g., arithmetic operations) on operands, such as vectors. The associative processing memory system 800 may be configured to support carrying through parity bits as described herein. Although described with reference to a single element per vector the techniques described herein may be implemented for vectors with any quantity of elements.

The associative processing memory system 800 may include planes P0 and P1, which may store respective sets of contiguous (e.g., sequential) bits for operands, such as vectors vA and vB. For example, the APM device that includes planes P0 and P1 may receive the vectors vA and vB and write the vectors vA and vB to the planes P0 and P1. Specifically, the APM device may write a first set of sequential bits (e.g., bits 0-7) for vector vA to plane P0 and may write a second set of sequential bits (e.g., bits 8-15) for vector vA to plane P1. Similarly, the APM device may write a first set of sequential bits (e.g., bits 0-7) for vector vB to plane P0 and may write a second set of sequential bits (e.g., bits 8-15) for vector vB to plane P1. So, plane P0 may store bits 0-7 for vectors vA and vB and plane P1 may store bits 8-15 for vectors vA and vB.

The planes P0 and P1 may also store respective sets of parity bits for vectors vA and vB. For example, the APM device that includes planes P0 and P1 may receive (or generate) the parity bit(s) for vector vA and vB (denoted P(vA) and P(vB), respectively) and write the parity bits to the planes P0 and P1. Specifically, the APM device may write a first set of one or more parity bits for bits 0-7 of vector vA (denoted P(vA(0:7)) to plane P0 and may write a second set of one or more parity bits for bits 8-15 of vector vA (denoted P(vA(8:15)) to plane P1. Similarly, the APM device may write a first set of one or more parity bits for bits 0-7 of vector vB (denoted P(vB(0:7)) to plane P0 and may write a second set of one or more parity bits for bits 8-15 of vector vB (denoted P(vB(0:7)) to plane P1. So, plane P0 may store the parity bits for bits 0-7 of vectors vA and vB and plane P1 may store the parity for bits 8-15 of vectors vA and vB.

For a given vector there may be one parity bit per plane, which may allow the APM device to perform error detection. For instance, P(vA(0:7)) may be one bit, P(vA(8:15)) may be one bit; P(vB(0:7)) may be one bit, P(vB(8:15)) may be one bit. Alternatively, for a given vector there may be multiple parity bits per plane, which may allow the APM device to perform error detection and correction.

The APM device may use associative processing to perform a computational operation on vector vA and vector vB. The APM device may also use associative processing to perform a computational operation on the parity bits for vector vA and vector vB. For example, the APM device may use truth table 805, which may be an example of truth table as described with reference to FIG. 2, to look up the results for the computational operation on a bit-by-bit basis. The APM device may use plane P0 to perform the computational operation on: 1) bits 0-7 of vector vA and vector vB and 2) the parity bits for bits 0-7 of vector vA and vector vB (e.g., P(vA(0:7)) and P(vB(0:7)). Similarly, the APM device may use plane P1 to perform the computational operation on: 1) bits 8-15 of vector vA and vector vB and 2) the parity bits for bits 8-15 of vector vA and vector vB (e.g., P(vA(8:15)) and P(vB(8:15)).

The result of the computational operation on bits 0-7 of vector vA and vector vB may be a first set of contiguous bits for vector vC (denoted vC(0:7)); and the result of the computational operation on the parity bits for bits 0-7 of vector vA and vector vB may be one or more parity bits for the first set of contiguous bits for vector vC (denoted P(vC(0:7)). The parity bits P(vC(0:7)) may indicate error information for bits 0-7 of vector vC that the APM device can use to detect and (potentially) correct one or more errors in vC(0:7). The result of the computational operation on bits 8-15 of vector vA and vector vB may be a second set of contiguous bits for vector vC (denoted vC(8:15)); and the result of the computational operation on the parity bits for bits 8-15 of vector vA and vector vB may be one or more parity bits for the second set of contiguous bits for vector vC (denoted P(vC(8:15)). The parity bits P(vC(8:15)) may indicate error information for bits 8-15 of vector that the APM device can use to detect and (potentially) correct one or more errors in vC(8:15).

The APM device may write the results of the computational operations to one or both of the planes P0 or P1, or to one or more different planes, or any combination thereof. For example, the APM device may write the result of the computational operation on bits 0-7 of vector vA and vector vB to plane P0 (or plane Px) and may write the result of the computational operation on the parity bits P(vA(0:7)) and P(vB(0:7)) to plane P0 (or plane Px). Similarly, the APM device may write the result of the computational operation on bits 8-15 of vector vA and vector vB to plane P1 (or plane Px or plane Py) and may write the result of the computational operation on the parity bits P(vA(8:15)) and P(vB(8:15)) to plane P1 (or plane Px or plane Py).

As noted, the parity bits P(vC(0:7)) may indicate error information for bits 0-7 of vector C and the parity bits P(vC(8:15)) may indicate error information for bits 8-15 of vector D. Thus, the APM device may use the parity bits for vector vC to perform error detection on vector vC. For example, the APM device may use parity bit(s) for bits 0-7 of vector vC (e.g., P(vC(0:7))) to determine whether there are any errors in bits 0-7 of vector vC. Similarly, the APM device may use parity bit(s) for bits 8-15 of vector vC (e.g., P(vC(8:15))) to determine whether there are any errors in bits 8-15 of vector vC.

The APM device may use the parity bits to perform error detection upon determination of the parity bits or the APM device may wait for a trigger condition to be satisfied before performing error detection. For example, the APM device may wait until a threshold quantity of computational operations have been performed on a set of bits (e.g., vector vA, vector vB, vector vC, or any combination thereof) before performing error detection for that set of bits. Additionally or alternatively, the APM device may wait until a threshold quantity of access operations (e.g., read operations, write operations) have been performed on a set of bits (e.g., vector vA, vector vB, vector vC, or any combination thereof) before performing error detection for that set of bits. Additionally or alternatively, the APM device may wait until a threshold amount of time has expired in between computational operations on a set of bits (e.g., vector vA, vector vB, vector vC, or any combination thereof) before performing error detection for that set of bits. Additionally or alternatively, the APM device may wait until a threshold amount of time has expired in between access operations on a set of bits (e.g., vector vA, vector vB, vector vC, or any combination thereof) before performing error detection for that set of bits. Additionally or alternatively, the APM device may wait until a threshold temperature has been reached for the APM device before performing error detection for a set of bits. In some examples, the APM device may wait until any combination of the example trigger conditions described herein along with other trigger conditions are satisfied before performing error detection.

In addition to performing error detection, the APM device may use the parity bits to perform error correction. The APM device may use the parity bits to perform error correction upon detection of one or more errors (e.g., during error detection) or the APM device may wait for a trigger condition to be satisfied before performing error correction. For example, the APM device may wait until a threshold quantity of errors are detected in a set of bits (e.g., vector vA, vector vB, vector vC, or any combination thereof) before performing error correction for the set of bits. Additionally or alternatively, the APM device may wait until a threshold quantity of computational operations have been performed on a set of bits (e.g., vector vA, vector vB, vector vC, or any combination thereof) before performing error correction for that set of bits. Additionally or alternatively, the APM device may wait until a threshold quantity of access operations (e.g., read operations, write operations) have been performed on a set of bits (e.g., vector vA, vector vB, vector vC, or any combination thereof) before performing error correction for that set of bits. Additionally or alternatively, the APM device may wait until a threshold amount of time has expired in between computational operations on a set of bits (e.g., vector vA, vector vB, vector vC, or any combination thereof) before performing error correction for that set of bits. Additionally or alternatively, the APM device may wait until a threshold amount of time has expired in between access operations on a set of bits (e.g., vector vA, vector vB, vector vC, or any combination thereof) before performing error correction for that set of bits. Additionally or alternatively, the APM device may wait until a threshold temperature has been reached for the APM device before performing error correction for a set of bits.

Thus, the APM device may discretionally perform error detection and error correction using parity bits. By using parity bits that are based on a linear code and carrying the parity bits through computational operations, the APM device may ensure that error information for a set of bits accumulates per computational operation (and thus may be used to perform error detection and error correction at various points of operation). In some examples, the APM device may determine whether to perform error detection, error correction, or both, based on a reliability mode indicated by a host device. For example, the APM device may support a high reliability mode and a low reliability mode. The high reliability mode may be associated with a first threshold quantity of errors and the low reliability mode may be associated with a second threshold quantity of errors that is greater than the first quantity.

In some examples, the APM device may carry through parity bits in a redundant computing scenario. For example, the APM device may use planes P2 and P3 to redundantly perform the computational operation on vectors vA and vB (e.g., planes P0 and P2 may be sister planes and planes P1 and P3 may be sister planes). Similar to plane P0, plane P2 may store bits 0-7 for vectors vA and vB (denoted vA'(0:7) and vB'(0:7), respectively) as well as the parity bits for bits 0-7 of vectors vA and vB (denoted P(vA'(0:7)) and P(vB'(0:7)), respectively). Similar to plane P1, plane P3 may store bits 8-15 for vectors vA and vB (denoted vA'(8:15) and vB'(8:15), respectively) as well as the parity for bits 8-15 of vectors vA and vB (denoted P(vA'(8:15)) and P(vB'(8:15)), respectively). Carrying through parity bits in a redundant computing scenario may allow the APM device to improve the reliability of a computational operation (e.g., by allowing the APM device to use the result with the fewest quantity of errors).

If the APM device uses redundant planes P2 and P3, the APM device may operate the respective pairs of sister planes (or in some examples more than two related planes) in serial mode (e.g., using one plane at a time per pair) or in parallel mode (e.g., using multiple planes at a time per pair). If the APM device uses operates in the serial mode, the APM device may first perform the computational operation on planes P0 and P2, then use the arithmetic bits computed by planes P0 and P2 to perform the computational operation using planes P1 and P3.

If the APM device operates in the parallel mode (e.g., as described with reference to FIGS. 3-6), the APM device may use a first value (e.g., 0) for arithmetic output bits (e.g., carry bits) for the computational operation performed using planes P0 and P1 and may use a second value (e.g., 1) for arithmetic output bits for the computational operation performed using planes P2 and P3. By implementing redundant computing, the APM device may perform the computational operation on each plane in parallel (e.g., without waiting for the arithmetic output bit from the previous plane), which may reduce latency associated with the computational operation.

So, in the parallel mode, the APM device may use plane P0 and a first value for an arithmetic output bit to: 1) perform a computational operation on bits 0-7 of vectors vA and vB, and 2) perform the computational operation on the parity bits for bits 0-7 of vectors vA and vB. In some examples, concurrently, the APM device may use plane P2 and a second value for an arithmetic output bit to: 1) perform a computational operation on bits 0-7 of vectors vA' and vB', and 2) perform the computational operation on the parity bits for bits 0-7 of vectors vA' and vB'. The result of the computational operation on bits 0-7 of vector vA' and vector vB' may be a first set of contiguous bits for vector vC' (denoted vC(0:7)); and the result of the computational operation on the parity bits for bits 0-7 of vector vA' and vector vB' may be output as one or more parity bits for the first set of contiguous bits for vector vC' (denoted P(vC'(0:7)). The parity bits P(vC'(0:7)) may indicate error information for bits 0-7 of vector vC' that the APM device can use to detect and (potentially) correct one or more errors in vC'(0:7).

Still referring to the parallel mode, the APM device may use plane P1 and a first value for an arithmetic output bit to: 1) perform a computational operation on bits 8-15 of vectors vA and vB, and 2) perform the computational operation on the parity bits for bits 8-15 of vectors vA and vB. Concurrently, the APM device may use plane P3 and a second value for an arithmetic output bit to: 1) perform a computational operation on bits 8-15 of vectors vA' and vB', and 2) perform the computational operation on the parity bits for bits 8-15 of vectors vA' and vB'. The result of the computational operation on bits 8-15 of vector vA' and vector vB' may be a second set of contiguous bits for vector vC' (denoted vC'(8:15)); and the result of the computational operation on the parity bits for bits 8-15 of vector vA' and vector vB' may be output as one or more parity bits for the second set of contiguous bits for vector vC" (denoted P(vC'(8:15)). The parity bits P(vC'(8:15)) may indicate error information for bits 8-15 of vector vC' that the APM device can use to detect and (potentially) correct one or more errors in vC(8:15).

Performing redundant computing in the parallel mode may allow the APM device to generate parity bits that account for arithmetic bits without waiting for less significant planes to finish the computational operation. For example, the APM device may generate parity bits for bits 0-7 of vector vA or vB based on the value for the arithmetic output bit for plane P0 and may generate parity bits for bits 0-7 of vector vA' or vB' based on the value for the arithmetic output bit for plane P2. Similarly, the APM device may generate parity bits for bits 8-15 of vector vA or vB based on the value for the arithmetic output bit for plane P1 and may generate parity bits for bits 8-15 of vector vA' or vB' based on the value for the arithmetic output bit for plane P3. If the APM device does not use the parallel mode, the APM device may wait for the computational operation performed by plane P0 to complete before generating (or updating) the parity bits for bits 8-15 of vector vA or vB based on the value of the arithmetic output bit from plane P0. Similarly, the APM device may wait for the computational operation performed by plane P2 to complete before generating (or updating) the parity bits for bits 8-15 of vector vA or vB based on the value of the arithmetic output bit from plane P2.

Figure 9:
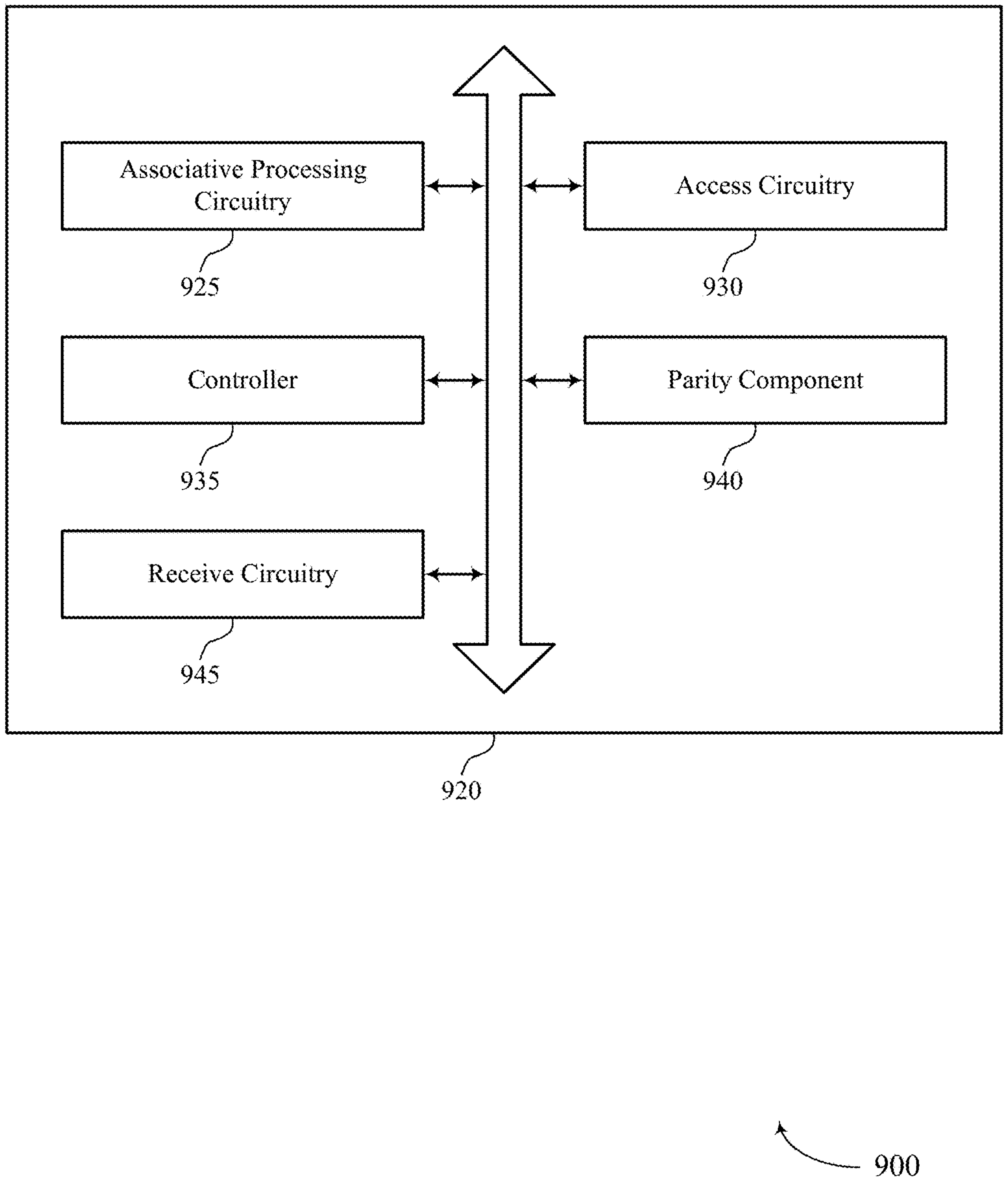
FIG. 9 shows a block diagram of an APM system that supports parity-based error management in accordance with examples as disclosed herein.

FIG. 9 shows a block diagram 900 of an APM system 920 that supports parity-based error management in accordance with examples as disclosed herein. The APM system 920 may be an example of aspects of an APM system as described with reference to FIGS. 1 through 8. The APM system 920, or various components thereof, may be an example of means for performing various aspects of parity-based error management as described herein. For example, the APM system 920 may include an associative processing circuitry 925, an access circuitry 930, a controller 935, a parity component 940, a receive circuitry 945, or any combination thereof. Each of these components may communicate, directly or indirectly, with one another (e.g., via one or more buses).

The associative processing circuitry 925 may be configured as or otherwise support a means for performing, by a memory plane of an associative processing memory, a computational operation on first data and second data stored in the memory plane, the first data representative of a set of contiguous bits of a first operand, and the second data representative of a set of contiguous bits of a second operand. In some examples, the associative processing circuitry 925 may be configured as or otherwise support a means for performing, by the memory plane of the associative processing memory, the computational operation on third data and fourth data stored in the memory plane, the third data representative of a first set of one or more parity bits for the first data, and the fourth data representative of a second set of one or more parity bits for the second data. The access circuitry 930 may be configured as or otherwise support a means for writing fifth data representative of a result of the computational operation on the first data and the second data and sixth data representative of a result of the computational operation on the third data and the fourth data.

In some examples, the controller 935 may be configured as or otherwise support a means for determining that the fifth data has an error based at least in part on the sixth data. In some examples, the access circuitry 930 may be configured as or otherwise support a means for correcting the error based at least in part on determining that the fifth data has the error.

In some examples, the controller 935 may be configured as or otherwise support a means for determining that a condition for performing error detection is satisfied, where the determination that the fifth data has the error is based at least in part on the condition being satisfied.

In some examples, the controller 935 may be configured as or otherwise support a means for determining that a condition for performing error correction is satisfied, where the error is corrected based at least in part on the condition for performing error correction being satisfied.

In some examples, the parity component 940 may be configured as or otherwise support a means for determining, based at least in part on receiving the first operand and the second operand, the first set of one or more parity bits and the second set of one or more parity bits. In some examples, the access circuitry 930 may be configured as or otherwise support a means for writing the first data, the first set of one or more parity bits, the second data, and the second set of one or more parity bits to the memory plane.

In some examples, the receive circuitry 945 may be configured as or otherwise support a means for receiving the first operand, the first set of one or more parity bits, the second operand, and the second set of one or more parity bits. In some examples, the access circuitry 930 may be configured as or otherwise support a means for writing the first data, the first set of one or more parity bits, the second data, and the second set of one or more parity bits to the memory plane.

In some examples, the associative processing circuitry 925 may be configured as or otherwise support a means for performing the computational operation on seventh data and eighth data stored in a second memory plane, the seventh data representative of a second set of contiguous bits of the first operand, and the eighth data representative of a second set of contiguous bits of the second operand. In some examples, the associative processing circuitry 925 may be configured as or otherwise support a means for performing the computational operation on ninth data and tenth data stored in the second memory plane, the ninth data representative of a third set of one or more parity bits for the seventh data, and the tenth data representative of a fourth set of one or more parity bits for the eighth data.

In some examples, the controller 935 may be configured as or otherwise support a means for determining that eleventh data representative of a result of the computational operation on the seventh data and the eighth data has an error based at least in part on twelfth data representative of a result of the computational operation on the ninth data and the tenth data.

In some examples, the associative processing circuitry 925 may be configured as or otherwise support a means for performing the computational operation on seventh data and eighth data stored in a second memory plane, the seventh data representative of the set of contiguous bits of the first operand, and the eighth data representative of the set of contiguous bits of the second operand. In some examples, the associative processing circuitry 925 may be configured as or otherwise support a means for performing the computational operation on ninth data and tenth data stored in the second memory plane, the ninth data representative of a third set of one or more parity bits for the seventh data, and the tenth data representative of a fourth set of one or more parity bits for the eighth data.

In some examples, the computational operation on the first data and the second data is based at least in part on a first value for an arithmetic output bit. In some examples, the computational operation on the seventh data and the eighth data is based at least in part on a second value for the arithmetic output bit.

In some examples, the controller 935 may be configured as or otherwise support a means for determining that the fifth data has an error based at least in part on the sixth data. In some examples, the controller 935 may be configured as or otherwise support a means for determining that eleventh data representative of a result of the computational operation on the seventh data and the eighth data is error-free based at least in part on twelfth data representative of a result of the computational operation on the ninth data and the tenth data. In some examples, the controller 935 may be configured as or otherwise support a means for selecting the eleventh data for a second computational operation based at least in part on the fifth data having the error and the eleventh data being error-free.

In some examples, the controller 935 may be configured as or otherwise support a means for determining a truth table associated with the computational operation, where the computational operation on the first data and the second data is performed based at least in part on the truth table, and where the computational operation on the third data and the fourth data is performed based at least in part on the truth table.

In some examples, the access circuitry 930 may be configured as or otherwise support a means for writing the fifth data and the sixth data to the memory plane or to a second memory plane.

In some examples, the associative processing circuitry 925 may be configured as or otherwise support a means for performing the computational operation on seventh data and eighth data stored in a second memory plane, the seventh data representative of the set of contiguous bits of the first operand, and the eighth data representative of the set of contiguous bits of the second operand, where the computational operation on the first data and the second data is based at least in part on a first value for an arithmetic output bit. In some examples, the associative processing circuitry 925 may be configured as or otherwise support a means for performing the computational operation on ninth data and tenth data stored in the second memory plane, the ninth data representative of a third set of one or more parity bits for the seventh data, and the tenth data representative of a fourth set of one or more parity bits for the eighth data, where the computational operation on the seventh data and the eighth data is based at least in part on a second value for the arithmetic output bit.

Figure 10:
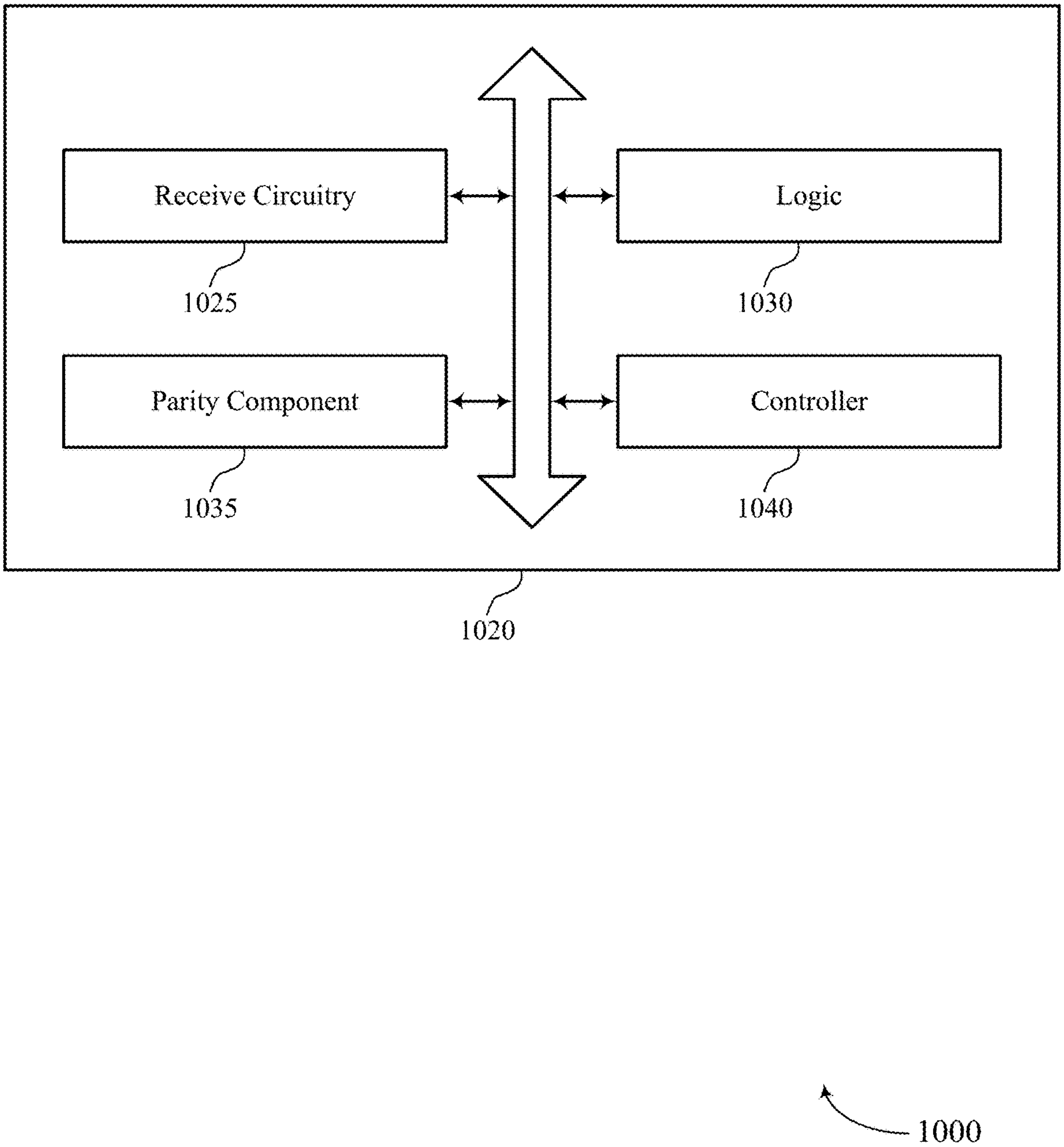
FIG. 10 shows a block diagram of a processing system that supports parity-based error management in accordance with examples as disclosed herein.

FIG. 10 shows a block diagram 1000 of a processing system 1020 that supports parity-based error management in accordance with examples as disclosed herein. The processing system 1020 may be an example of aspects of a processing system as described with reference to FIGS. 1 through 8. The processing system 1020, or various components thereof, may be an example of means for performing various aspects of parity-based error management as described herein. For example, the processing system 1020 may include a receive circuitry 1025, a logic 1030, a parity component 1035, a controller 1040, or any combination thereof. Each of these components may communicate, directly or indirectly, with one another (e.g., via one or more buses).

The receive circuitry 1025 may be configured as or otherwise support a means for receiving, by logic of a processing system, first data representative of a first operand and second data representative of a second operand. The logic 1030 may be configured as or otherwise support a means for performing a computational operation on the first data and the second data. In some examples, the logic 1030 may be configured as or otherwise support a means for performing, by the logic, the computational operation on third data representative of a first set of one or more parity bits for the first data and on fourth data representative of a second set of one or more parity bits for the second data. In some examples, the logic 1030 may be configured as or otherwise support a means for outputting, by the logic, fifth data representative of a result of the computational operation on the first data and the second data and outputting sixth data representative of a result of the computational operation on the third data and the fourth data.

In some examples, the parity component 1035 may be configured as or otherwise support a means for determining, based at least in part on receiving the first data and the second data, the first set of one or more parity bits and the second set of one or more parity bits. In some examples, the receive circuitry 1025 may be configured as or otherwise support a means for receiving the first set of one or more parity bits and the second set of one or more parity bits.

In some examples, the controller 1040 may be configured as or otherwise support a means for determining that the fifth data has one or more errors based at least in part on the sixth data. In some examples, the controller 1040 may be configured as or otherwise support a means for correcting the one or more errors based at least in part on determination.

In some examples, the logic 1030 may be configured as or otherwise support a means for performing a second computational operation on the fifth data and seventh data representative of a third operand. In some examples, the logic 1030 may be configured as or otherwise support a means for performing the second computational operation on the sixth data and eighth data representative of one or more parity bits for the third data.

In some examples, the controller 1040 may be configured as or otherwise support a means for determining that ninth data representative of a result of the second computational operation on the fifth data and the seventh data has an error based at least in part on tenth data representative of a result of the computational operation on the sixth data and the eighth data.

In some examples, the logic 1030 may be configured as or otherwise support a means for communicating the fifth data and the sixth data to second logic of the processing system for a second operation. In some examples, the logic 1030 may be configured as or otherwise support a means for communicating the fifth data and the sixth data to a memory device for storage.

Figure 11:
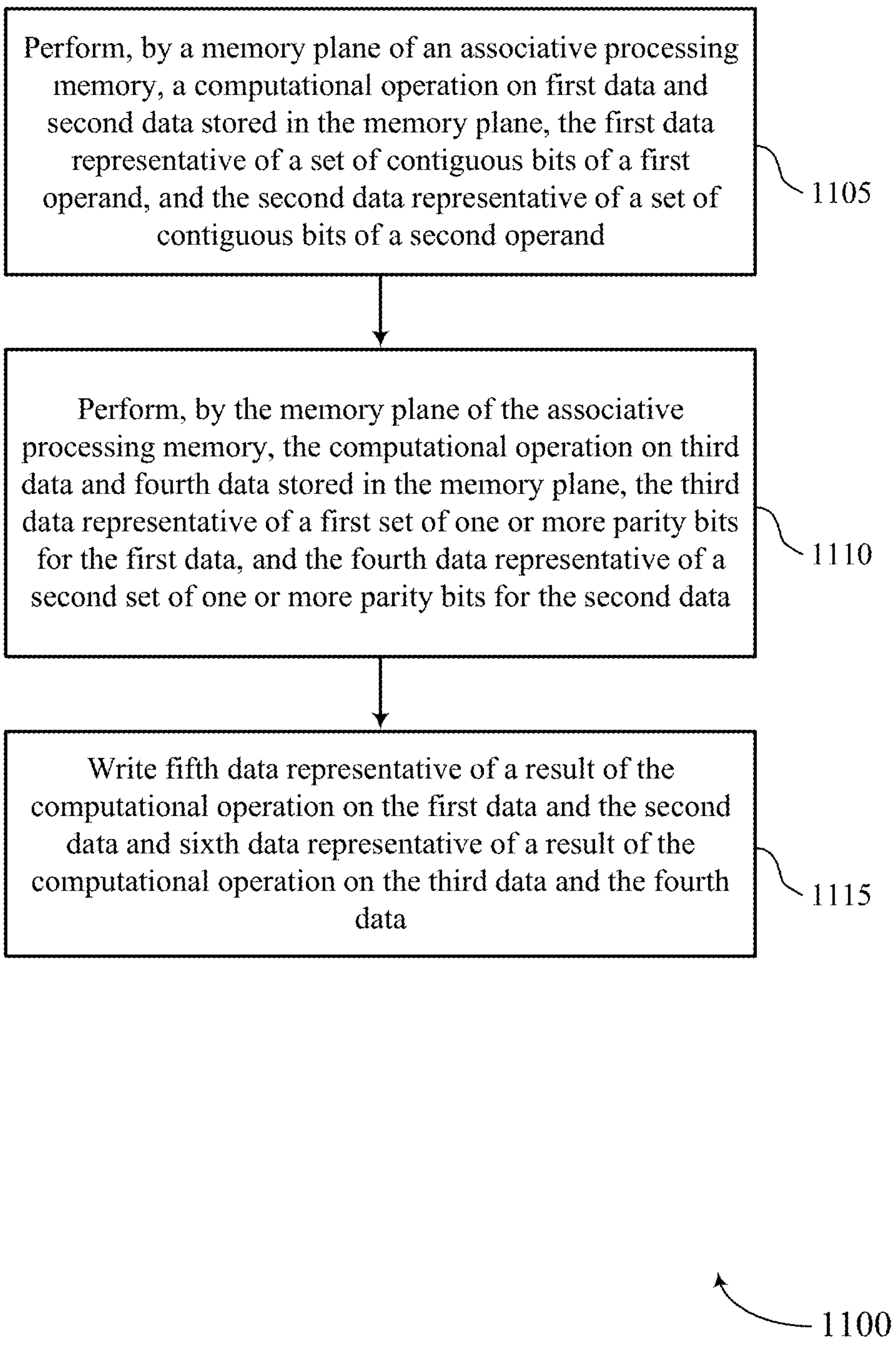
FIGS. 11 and 12 show flowcharts illustrating a method or methods that support parity-based error management in accordance with examples as disclosed herein.

FIG. 11 shows a flowchart illustrating a method 1100 that supports parity-based error management in accordance with examples as disclosed herein. The operations of method 1100 may be implemented by an APM system or its components as described herein. For example, the operations of method 1100 may be performed by an APM system as described with reference to FIGS. 1 through 9. In some examples, an APM system may execute a set of instructions to control the functional elements of the device to perform the described functions. Additionally or alternatively, the APM system may perform aspects of the described functions using special-purpose hardware.

At 1105, the method may include performing, by a memory plane (e.g., plane P0 in FIG. 8) of an associative processing memory, a computational operation on first data and second data stored in the memory plane, the first data representative of a set of contiguous bits (e.g., bits 0-7) of a first operand (e.g., vector vA), and the second data representative of a set of contiguous bits (e.g., bits 0-7) of a second operand (e.g., vector vB). The operations of 1105 may be performed in accordance with examples as disclosed herein. In some examples, aspects of the operations of 1105 may be performed by an associative processing circuitry 925 as described with reference to FIG. 9.

At 1110, the method may include performing, by the memory plane of the associative processing memory, the computational operation on third data and fourth data stored in the memory plane, the third data representative of a first set of one or more parity bits for the first data (e.g., P(vA(0:7))), and the fourth data representative of a second set of one or more parity bits for the second data (e.g., P(vB(0:7))). The operations of 1110 may be performed in accordance with examples as disclosed herein. In some examples, aspects of the operations of 1110 may be performed by an associative processing circuitry 925 as described with reference to FIG. 9.

At 1115, the method may include writing fifth data representative of a result (e.g., vC(0:7)) of the computational operation on the first data and the second data and sixth data representative of a result (e.g., P(vC(0:7))) of the computational operation on the third data and the fourth data. The operations of 1115 may be performed in accordance with examples as disclosed herein. In some examples, aspects of the operations of 1115 may be performed by an access circuitry 930 as described with reference to FIG. 9.

In some examples, an apparatus as described herein may perform a method or methods, such as the method 1100. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for performing, by a memory plane of an associative processing memory, a computational operation on first data and second data stored in the memory plane, the first data representative of a set of contiguous bits of a first operand, and the second data representative of a set of contiguous bits of a second operand; performing, by the memory plane of the associative processing memory, the computational operation on third data and fourth data stored in the memory plane, the third data representative of a first set of one or more parity bits for the first data, and the fourth data representative of a second set of one or more parity bits for the second data; and writing fifth data representative of a result of the computational operation on the first data and the second data and sixth data representative of a result of the computational operation on the third data and the fourth data.

Aspect 2: The method, apparatus, or non-transitory computer-readable medium of aspect 1, further including operations, features, circuitry, logic, means, or instructions, or any combination thereof for determining that the fifth data has an error based at least in part on the sixth data and correcting the error based at least in part on determining that the fifth data has the error.

Aspect 3: The method, apparatus, or non-transitory computer-readable medium of aspect 2, further including operations, features, circuitry, logic, means, or instructions, or any combination thereof for determining that a condition for performing error detection is satisfied, where the determination that the fifth data has the error is based at least in part on the condition being satisfied.

Aspect 4: The method, apparatus, or non-transitory computer-readable medium of aspect 3, further including operations, features, circuitry, logic, means, or instructions, or any combination thereof for determining that a condition for performing error correction is satisfied, where the error is corrected based at least in part on the condition for performing error correction being satisfied.

Aspect 5: The method, apparatus, or non-transitory computer-readable medium of any of aspects 1 through 4, further including operations, features, circuitry, logic, means, or instructions, or any combination thereof for determining, based at least in part on receiving the first operand and the second operand, the first set of one or more parity bits and the second set of one or more parity bits and writing the first data, the first set of one or more parity bits, the second data, and the second set of one or more parity bits to the memory plane.

Aspect 6: The method, apparatus, or non-transitory computer-readable medium of any of aspects 1 through 5, further including operations, features, circuitry, logic, means, or instructions, or any combination thereof for receiving the first operand, the first set of one or more parity bits, the second operand, and the second set of one or more parity bits and writing the first data, the first set of one or more parity bits, the second data, and the second set of one or more parity bits to the memory plane.

Aspect 7: The method, apparatus, or non-transitory computer-readable medium of any of aspects 1 through 6, further including operations, features, circuitry, logic, means, or instructions, or any combination thereof for performing the computational operation on seventh data and eighth data stored in a second memory plane (e.g., plane P1 in FIG. 8), the seventh data representative of a second set of contiguous bits (e.g., bits 8-15) of the first operand (e.g., vector vA), and the eighth data representative of a second set of contiguous bits (e.g., bits 8-15) of the second operand (e.g., vector vB) and performing the computational operation on ninth data and tenth data stored in the second memory plane, the ninth data representative of a third set of one or more parity bits (e.g., P(vA(8:15))) for the seventh data, and the tenth data representative of a fourth set of one or more parity bits (e.g., P(vB(8:15))) for the eighth data.

Aspect 8: The method, apparatus, or non-transitory computer-readable medium of aspect 7, further including operations, features, circuitry, logic, means, or instructions, or any combination thereof for determining that eleventh data representative of a result (e.g., vC(8:15)) of the computational operation on the seventh data and the eighth data has an error based at least in part on twelfth data representative of a result (e.g., P(vC(8:15))) of the computational operation on the ninth data and the tenth data.

Aspect 9: The method, apparatus, or non-transitory computer-readable medium of any of aspects 1 through 8, further including operations, features, circuitry, logic, means, or instructions, or any combination thereof for performing the computational operation on seventh data and eighth data stored in a second memory plane (e.g., plane P2 in FIG. 8), the seventh data (e.g., vA'(0:7)) representative of the set of contiguous bits (e.g., bits 0-7) of the first operand (e.g., vector vA), and the eighth data (e.g., vB'(0:7)) representative of the set of contiguous bits (e.g., bits 0-7) of the second operand (e.g., vector vB) and performing the computational operation on ninth data (e.g., P(vA'(0:7))) and tenth data (e.g., P(vB'(0:7))) stored in the second memory plane, the ninth data representative of a third set of one or more parity bits for the seventh data, and the tenth data representative of a fourth set of one or more parity bits for the eighth data.

Aspect 10: The method, apparatus, or non-transitory computer-readable medium of aspect 9 where the computational operation on the first data and the second data is based at least in part on a first value (e.g., 0) for an arithmetic output bit and the computational operation on the seventh data and the eighth data is based at least in part on a second value (e.g., 1) for the arithmetic output bit.

Aspect 11: The method, apparatus, or non-transitory computer-readable medium of any of aspects 9 through 10, further including operations, features, circuitry, logic, means, or instructions, or any combination thereof for determining that the fifth data has an error based at least in part on the sixth data; determining that eleventh data (e.g., vC'(0:7))) representative of a result of the computational operation on the seventh data and the eighth data is error-free based at least in part on twelfth data (e.g., P(vC'(0:7))) representative of a result of the computational operation on the ninth data and the tenth data; and selecting the eleventh data for a second computational operation based at least in part on the fifth data having the error and the eleventh data being error-free.

Aspect 12: The method, apparatus, or non-transitory computer-readable medium of any of aspects 1 through 11, further including operations, features, circuitry, logic, means, or instructions, or any combination thereof for determining a truth table (e.g., truth table 805) associated with the computational operation, where the computational operation on the first data and the second data is performed based at least in part on the truth table, and where the computational operation on the third data and the fourth data is performed based at least in part on the truth table.

Aspect 13: The method, apparatus, or non-transitory computer-readable medium of any of aspects 1 through 12, further including operations, features, circuitry, logic, means, or instructions, or any combination thereof for writing the fifth data and the sixth data to the memory plane or to a second memory plane.

Figure 12:
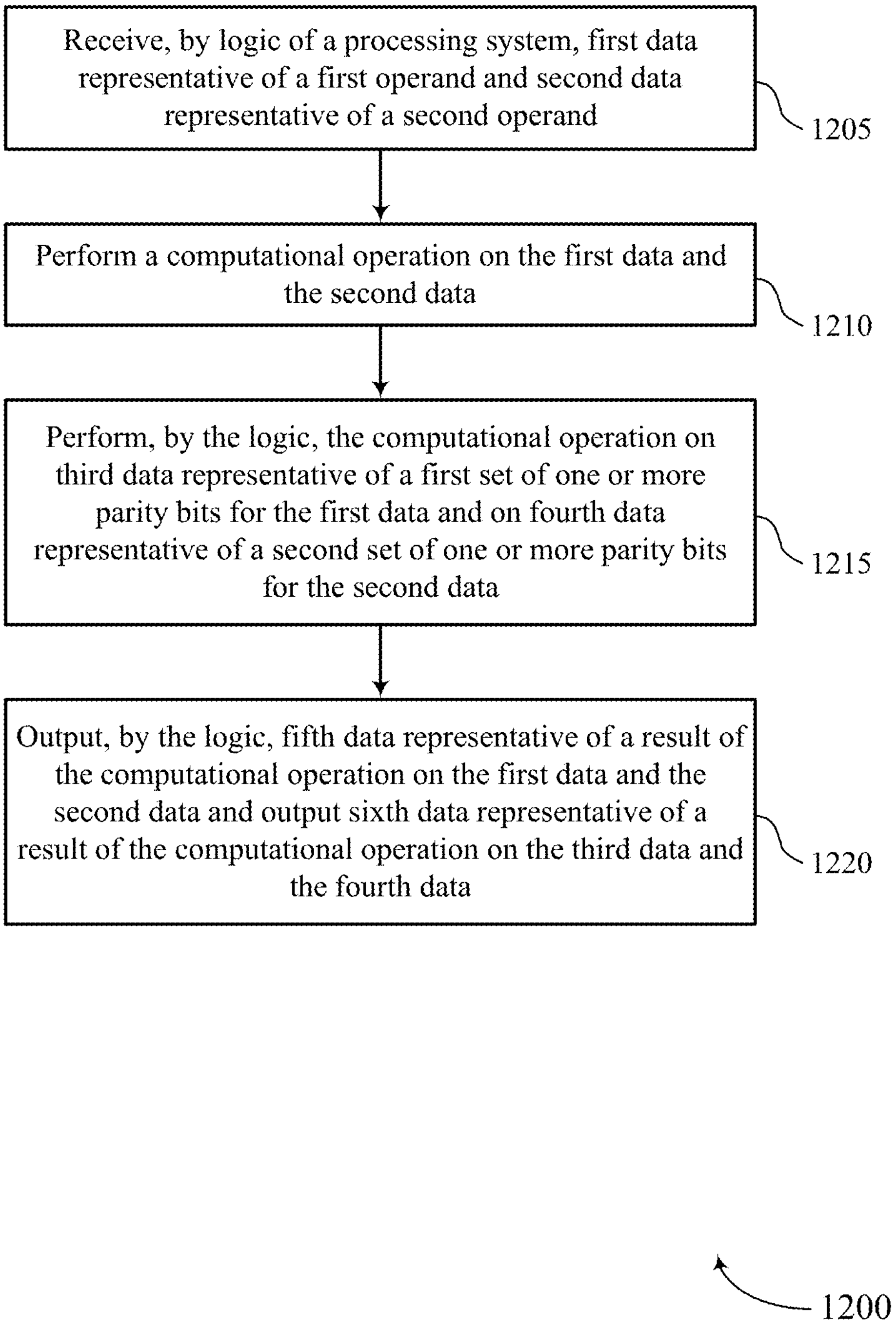

FIG. 12 shows a flowchart illustrating a method 1200 that supports parity-based error management in accordance with examples as disclosed herein. The operations of method 1200 may be implemented by a processing system or its components as described herein. For example, the operations of method 1200 may be performed by a processing system as described with reference to FIGS. 1 through 8 and 10. In some examples, a processing system may execute a set of instructions to control the functional elements of the device to perform the described functions. Additionally or alternatively, the processing system may perform aspects of the described functions using special-purpose hardware.

At 1205, the method may include receiving, by logic of a processing system, first data representative of a first operand and second data representative of a second operand. The operations of 1205 may be performed in accordance with examples as disclosed herein. In some examples, aspects of the operations of 1205 may be performed by a receive circuitry 1025 as described with reference to FIG. 10.

At 1210, the method may include performing a computational operation on the first data and the second data. The operations of 1210 may be performed in accordance with examples as disclosed herein. In some examples, aspects of the operations of 1210 may be performed by a logic 1030 as described with reference to FIG. 10.

At 1215, the method may include performing, by the logic, the computational operation on third data representative of a first set of one or more parity bits for the first data and on fourth data representative of a second set of one or more parity bits for the second data. The operations of 1215 may be performed in accordance with examples as disclosed herein. In some examples, aspects of the operations of 1215 may be performed by a logic 1030 as described with reference to FIG. 10.

At 1220, the method may include outputting, by the logic, fifth data representative of a result of the computational operation on the first data and the second data and outputting sixth data representative of a result of the computational operation on the third data and the fourth data. The operations of 1220 may be performed in accordance with examples as disclosed herein. In some examples, aspects of the operations of 1220 may be performed by a logic 1030 as described with reference to FIG. 10.

In some examples, an apparatus as described herein may perform a method or methods, such as the method 1200. The apparatus may include features, circuitry, logic, means, or instructions (e.g., a non-transitory computer-readable medium storing instructions executable by a processor), or any combination thereof for performing the following aspects of the present disclosure:

Aspect 15: A method, apparatus, or non-transitory computer-readable medium including operations, features, circuitry, logic, means, or instructions, or any combination thereof for receiving, by logic (e.g., functional block 710 in FIG. 7) of a processing system (e.g., processing system 700 in FIG. 7), first data representative of a first operand (e.g., vector vA) and second data representative of a second operand (e.g., vector vB); performing a computational operation on the first data and the second data; performing, by the logic, the computational operation on third data representative of a first set of one or more parity bits (e.g., Pv(A)) for the first data and on fourth data representative of a second set of one or more parity bits (e.g. P(v(B)) for the second data; and outputting, by the logic, fifth data representative of a result (e.g., vector vC) of the computational operation on the first data and the second data and outputting sixth data representative of a result (e.g., P(vC)) of the computational operation on the third data and the fourth data.

Aspect 16: The method, apparatus, or non-transitory computer-readable medium of aspect 15, further including operations, features, circuitry, logic, means, or instructions, or any combination thereof for determining (e.g., by parity generator 705), based at least in part on receiving the first data and the second data, the first set of one or more parity bits and the second set of one or more parity bits.

Aspect 17: The method, apparatus, or non-transitory computer-readable medium of any of aspects 15 through 16, further including operations, features, circuitry, logic, means, or instructions, or any combination thereof for receiving the first set of one or more parity bits and the second set of one or more parity bits.

Aspect 18: The method, apparatus, or non-transitory computer-readable medium of any of aspects 15 through 17, further including operations, features, circuitry, logic, means, or instructions, or any combination thereof for determining that the fifth data has one or more errors based at least in part on the sixth data and correcting the one or more errors based at least in part on determination.

Aspect 19: The method, apparatus, or non-transitory computer-readable medium of any of aspects 15 through 18, further including operations, features, circuitry, logic, means, or instructions, or any combination thereof for performing (e.g., by functional block 715) a second computational operation on the fifth data and seventh data representative of a third operand (e.g., vector vD) and performing the second computational operation on the sixth data and eighth data representative of one or more parity bits (e.g., P(vD)) for the third data.

Aspect 20: The method, apparatus, or non-transitory computer-readable medium of aspect 19, further including operations, features, circuitry, logic, means, or instructions, or any combination thereof for determining that ninth data representative of a result (e.g., vector vE) of the second computational operation on the fifth data and the seventh data has an error based at least in part on tenth data representative of a result (e.g., P(vd)) of the computational operation on the sixth data and the eighth data.

Aspect 21: The method, apparatus, or non-transitory computer-readable medium of any of aspects 15 through 20, further including operations, features, circuitry, logic, means, or instructions, or any combination thereof for communicating the fifth data and the sixth data to second logic (e.g., functional block 715) of the processing system for a second operation.

Aspect 22: The method, apparatus, or non-transitory computer-readable medium of any of aspects 15 through 21, further including operations, features, circuitry, logic, means, or instructions, or any combination thereof for communicating the fifth data and the sixth data to a memory device for storage.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 23: An apparatus, including: a memory device including a memory plane with content-addressable memory cells; and logic coupled with the memory device and configured to cause the apparatus to: perform, using the memory plane, a computational operation on first data and second data stored in the memory plane, the first data representative of a set of contiguous bits of a first operand, and the second data representative of a set of contiguous bits of a second operand; and perform, using the memory plane and based at least in part on performing the computational operation on first data and the second data, the computational operation on third data and fourth data stored in the memory plane, the third data representative of a first set of one or more parity bits for the first data, and the fourth data representative of a second set of one or more parity bits for the second data; and determine that fifth data representative of a result of the computational operation on the first data and the second data has an error, the determination based at least in part on sixth data representative of a result of the computational operation on the third data and the fourth data.

Aspect 24: The apparatus of aspect 23, where the logic is further configured to cause the memory device to: perform the computational operation on seventh data and eighth data, the seventh data representative of a second set of contiguous bits of the first operand, and the eighth data representative of a second set of contiguous bits of the second operand; and perform the computational operation on ninth data and tenth data, the ninth data representative of a third set of one or more parity bits for the seventh data, and the tenth data representative of a fourth set of one or more parity bits for the eighth data.

Aspect 25: The apparatus of aspect 24, where the logic is further configured to cause the memory device to: determine that eleventh data representative of a result of the computational operation on the seventh data and the eighth data has an error based at least in part on twelfth data representative of a result of the computational operation on the ninth data and the tenth data.

Aspect 26: The apparatus of any of aspects 23 through 25, where the logic is further configured to cause the memory device to: determine a truth table associated with the computational operation, where the computational operation on the first data and the second data is performed based at least in part on the truth table, and where the computational operation on the third data and the fourth data is performed based at least in part on the truth table.

An apparatus is described. The following provides an overview of aspects of the apparatus as described herein:

Aspect 27: An apparatus, including: logic configured to cause the apparatus to: perform a computational operation on the first data representative of a first operand and second data representative of a second operand; perform the computational operation on third data representative of a set of one or more parity bits for the first data and on fourth data representative of a set of one or more parity bits for the second data; and output fifth data representative of a result of the computational operation on the first data and the second data and output sixth data representative of a result of the computational operation on the third data and the fourth data.

Aspect 28: The apparatus of aspect 27, where the logic is further configured to cause the apparatus to: perform a second computational operation on the fifth data and seventh data representative of a third operand; and perform the second computational operation on the sixth data and eighth data representative of one or more parity bits for the third data.

Aspect 29: The apparatus of any of aspects 27 through 28, where the logic is further configured to cause the apparatus to determine that the fifth data has one or more errors based at least in part on the sixth data; and correct the one or more errors based at least in part on determination.

Aspect 30: The apparatus of any of aspects 27 through 29, where the logic is further configured to cause the apparatus to: communicate the fifth data and the sixth data to second logic for a second operation, communicate the fifth data and the sixth data to a memory device for storage, or both.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The terms "layer" and "level" used herein refer to an organization (e.g., a stratum, a sheet) of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, or materials. In some examples, one layer or level may be composed of two or more sublayers or sublevels.

As used herein, the term "electrode" may refer to an electrical conductor, and in some examples, may be employed as an electrical contact to a memory cell or other component of a memory array. An electrode may include a trace, a wire, a conductive line, a conductive layer, or the like that provides a conductive path between components of a memory array.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A memory system, comprising:
- one or more memory devices;
- an associative processing memory; and
- processing circuitry coupled with the one or more memory devices and the associative processing memory, the processing circuitry configured to cause the memory system to:
  - sense a set of content-addressable memory cells that store a truth table associated with a computational operation;
  - perform, by the associative processing memory and based at least in part on sensing the set of content-addressable memory cells, the computational operation on first data stored in first memory cells and second data stored in second memory cells;
  - perform, by the associative processing memory and based at least in part on sensing the set of content-addressable memory cells, the computational operation on a first set of one or more parity bits, for the first data, that is based at least in part on a quantity of the first memory cells storing a first logic value, and on a second set of one or more parity bits, for the second data, that is based at least in part on a quantity of the second memory cells storing the first logic value; and
  - determine whether third data representative of a result of the computational operation on the first data and the second data includes at least one error using fourth data representative of a result of the computational operation on the first set of one or more parity bits for the first data and the second set of one or more parity bits for the second data.

2. The memory system of claim 1, wherein the processing circuitry is further configured to cause the memory system to:
- write, to third memory cells of a memory plane of the associative processing memory, the third data representative of the result of the computational operation on the first data and the second data and fourth data representative of the result of the computational operation on the first set of one or more parity bits for the first data and the second set of one or more parity bits for the second data.

3. The memory system of claim 1, wherein, to determine whether the third data includes an error, the processing circuitry is configured to cause the memory system to:
- determine that the third data includes the at least one error based at least in part on the fourth data, wherein the processing circuitry is further configured to cause the memory system to:
  - correct the at least one error based at least in part on determining that the third data has the error.

4. The memory system of claim 3, wherein the processing circuitry is further configured to cause the memory system to:
- determine that a condition for performing error correction is satisfied, wherein the at least one error is corrected based at least in part on the condition for performing error correction being satisfied.

5. The memory system of claim 1, wherein the processing circuitry is further configured to cause the memory system to:
- determine that a condition for performing error detection is satisfied, wherein determining whether the third data includes the at least one error is based at least in part on the condition being satisfied.

6. The memory system of claim 1, wherein the processing circuitry is further configured to cause the memory system to:
- sense the first memory cells to determine the quantity of the first memory cells storing the first logic value; and
- sense the second memory cells to determine the quantity of the second memory cells storing the first logic value.

7. The memory system of claim 1, wherein the first data is representative of a set of contiguous bits of a first operand and the second data is representative of a set of contiguous bits of a second operand, the first operand and the second operand associated with the computational operation, and wherein, to perform the computational operation on the first data and the second data, the processing circuitry is further configured to cause the memory system to:
- compare one or more first operand bits associated with the first operand and one or more second operand bits associated with the second operand with one or more entries of a truth table.

8. The memory system of claim 7, wherein the processing circuitry is further configured to cause the memory system to:
- receive the first operand, the second operand, the first set of one or more parity bits, and the second set of one or more parity bits; and
- write the first data and the second data to a memory plane of the associative processing memory based at least in part on receiving the first operand, the second operand, the first set of one or more parity bits, and the second set of one or more parity bits.

9. The memory system of claim 1, wherein the first data is representative of a set of contiguous bits of a first operand and the second data is representative of a set of contiguous bits of a second operand, the first operand and the second operand associated with the computational operation, and wherein the processing circuitry is further configured to cause the memory system to:
- perform the computational operation on fifth data and sixth data stored in a second memory plane of the associative processing memory, the fifth data representative of a second set of contiguous bits of the first operand, and the sixth data representative of a second set of contiguous bits of the second operand; and perform the computational operation on seventh data and eighth data stored in the second memory plane, the seventh data representative of a third set of one or more parity bits for the fifth data, and the eighth data representative of a fourth set of one or more parity bits for the sixth data.

10. The memory system of claim 9, wherein the processing circuitry is further configured to cause the memory system to:

determine that ninth data representative of a result of the computational operation on the fifth data and the sixth data has an error based at least in part on tenth data representative of a result of the computational operation on the seventh data and the eighth data.

11. The memory system of claim 9, wherein the computational operation on the first data and the second data is based at least in part on a first value for an arithmetic output bit, and wherein the computational operation on the fifth data and the sixth data is based at least in part on a second value for the arithmetic output bit.

12. The memory system of claim 9, wherein the processing circuitry is further configured to cause the memory system to:

determine that the third data has an error based at least in part on the fourth data;

determine that ninth data representative of a result of the computational operation on the fifth data and the sixth data is error-free based at least in part on tenth data representative of a result of the computational operation on the seventh data and the eighth data; and select the ninth data for a second computational operation based at least in part on the third data having the error and the ninth data being error-free.

13. A method by a memory system, comprising:

sensing a set of content-addressable memory cells that store a truth table associated with a computational operation;

performing, by an associative processing memory of the memory system and based at least in part on sensing the set of content-addressable memory cells, the computational operation on first data stored in first memory cells and second data stored in second memory cells;

performing, by the associative processing memory and based at least in part on sensing the set of content-addressable memory cells, the computational operation on a first set of one or more parity bits, for the first data, that is based at least in part on a quantity of the first memory cells storing a first logic value, and on a second set of one or more parity bits, for the second data, that is based at least in part on a quantity of the second memory cells storing the first logic value; and determining whether third data representative of a result of the computational operation on the first data and the second data includes at least one error using fourth data representative of a result of the computational operation on the first set of one or more parity bits for the first data and the second set of one or more parity bits for the second data.

14. The method of claim 13, further comprising:

writing, to third memory cells of a memory plane of an associative processing memory, the third data representative of the result of the computational operation on the first data and the second data and fourth data representative of the result of the computational operation on the first set of one or more parity bits for the first data and the second set of one or more parity bits for the second data.

15. The method of claim 13, wherein determining whether the third data includes an error comprises:

determining that the third data includes the at least one error based at least in part on the fourth data, the method further comprising:

determining that a condition for performing error correction is satisfied; and correcting the at least one error based at least in part on determining that the third data has the error and based at least in part on the condition for performing error correction being satisfied.

16. The method of claim 13, further comprising:

determining that a condition for performing error detection is satisfied, wherein determining whether the third data includes the at least one error is based at least in part on the condition being satisfied.

17. The method of claim 13, further comprising:

sensing the first memory cells to determine the quantity of the first memory cells storing the first logic value; and sensing the second memory cells to determine the quantity of the second memory cells storing the first logic value.

18. The method of claim 13, the method further comprising:

receiving a first operand, a second operand, the first set of one or more parity bits, and the second set of one or more parity bits, wherein the first data is representative of a set of contiguous bits of the first operand and the second data is representative of a set of contiguous bits of the second operand, the first operand and the second operand associated with the computational operation; and writing the first data and the second data to a memory plane of an associative processing memory.

19. A non-transitory computer-readable medium storing code comprising instructions which, when executed by processing circuitry of an electronic device, cause the electronic device to:

sense a set of content-addressable memory cells that store a truth table associated with a computational operation;

perform, by an associative processing memory and based at least in part on sensing the set of content-addressable memory cells, the computational operation on first data stored in first memory cells and second data stored in second memory cells;

perform, by the associative processing memory and based at least in part on sensing the set of content-addressable memory cells, the computational operation on a first set of one or more parity bits, for the first data, that is based at least in part on a quantity of the first memory cells storing a first logic value, and on a second set of one or more parity bits, for the second data, that is based at least in part on a quantity of the second memory cells storing the first logic value; and determine whether third data representative of a result of the computational operation on the first data and the second data includes at least one error using fourth data representative of a result of the computational operation on the first set of one or more parity bits for the first data and the second set of one or more parity bits for the second data.

* * * * *